United States Patent
Takada et al.

(10) Patent No.: US 11,860,007 B2
(45) Date of Patent: *Jan. 2, 2024

(54) ENCODER, SERVO MOTOR, AND SERVO SYSTEM

(71) Applicant: KABUSHIKI KAISHA YASKAWA DENKI, Kitakyushu (JP)

(72) Inventors: Hiroshi Takada, Kitakyushu (JP); Yasushi Yoshida, Kitakyushu (JP); Shiro Yoshidomi, Kitakyushu (JP); Masanobu Harada, Kitakyushu (JP); Yasuhiro Matsutani, Kitakyushu (JP); Daisuke Furukawa, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,653

(22) Filed: Dec. 22, 2022

(65) Prior Publication Data

US 2023/0129497 A1    Apr. 27, 2023

Related U.S. Application Data

(63) Continuation of application No. 16/931,493, filed on Jul. 17, 2020, now Pat. No. 11,566,920.

(30) Foreign Application Priority Data

Jul. 19, 2019  (JP) ................. 2019-133346

(51) Int. Cl.
*G05B 19/35* (2006.01)
*G01D 5/347* (2006.01)

(52) U.S. Cl.
CPC ....... *G01D 5/34715* (2013.01); *G01D 5/3473* (2013.01); *G05B 19/358* (2013.01); *G01D 5/34792* (2013.01)

(58) Field of Classification Search
CPC .................. G01D 5/3473; G05B 19/358
See application file for complete search history.

(56) References Cited

U.S. PATENT DOCUMENTS

| 7,348,543 B2 * | 3/2008 | Villaret | G01D 5/34723 356/614 |
| 8,124,928 B2 * | 2/2012 | Villaret | G01D 5/34723 359/441 |

(Continued)

FOREIGN PATENT DOCUMENTS

| CN | 103718004 | 4/2014 |
| CN | 204188180 U | 3/2015 |

(Continued)

OTHER PUBLICATIONS

Extended European Search Report for corresponding EP Application No. 20186424.6-1010, dated Dec. 9, 2020.

(Continued)

*Primary Examiner* — Rina I Duda
(74) *Attorney, Agent, or Firm* — MORI & WARD, LLP

(57) ABSTRACT

An encoder includes a scale and a sensor. The scale has first and second absolute patterns. The sensor includes a light source, and first and second absolute light receivers. The first and second absolute light receivers receive light from the first and second absolute patterns, respectively. The first absolute light receiver receives light from the first pattern and includes first and second light receiving elements. Each first light receiving elements outputs a first signal with a first phase. Each second light receiving elements outputs a first signal with a second phase. The first and second light receiving elements are arranged alternately. The second absolute light receiver includes third and fourth light receiving elements. Each third light receiving element outputs a second signal with the first phase. The third and fourth light (Continued)

receiving elements are arranged alternately. Each fourth light receiving element outputs a second signal with the second phase.

16 Claims, 16 Drawing Sheets

(56) References Cited

U.S. PATENT DOCUMENTS

| | | | |
|---|---|---|---|
| 8,575,876 B2* | 11/2013 | Inoue | G01D 5/3473 |
| | | | 318/400.4 |
| 9,281,729 B2* | 3/2016 | Yoshidomi | H02K 11/225 |
| 9,391,550 B2* | 7/2016 | Tarui | H02P 6/16 |
| 2004/0130690 A1 | 7/2004 | Koren et al. | |
| 2007/0288121 A1 | 12/2007 | Shibazaki | |
| 2008/0054167 A1 | 3/2008 | Sasaki et al. | |
| 2012/0205527 A1 | 8/2012 | Yoshida et al. | |
| 2013/0154447 A1 | 6/2013 | Harada | |
| 2013/0229138 A1 | 9/2013 | Yoshida et al. | |
| 2014/0132124 A1 | 5/2014 | Yoshida et al. | |
| 2015/0122982 A1 | 5/2015 | Yoshida et al. | |
| 2015/0260551 A1 | 9/2015 | Yamanobe | |
| 2015/0292918 A1 | 10/2015 | Yoshida et al. | |
| 2015/0292919 A1 | 10/2015 | Ogasawara | |
| 2016/0161295 A1 | 6/2016 | Uemura et al. | |
| 2016/0178407 A1 | 6/2016 | Yoshida et al. | |

FOREIGN PATENT DOCUMENTS

| | | |
|---|---|---|
| CN | 104977032 | 10/2015 |
| JP | 2008-083019 | 4/2008 |
| JP | 2012-103032 | 5/2012 |
| JP | 2015-200613 | 11/2015 |
| WO | WO2013/014721 | 1/2013 |

OTHER PUBLICATIONS

Japanese Office Action for corresponding JP Application No. 2019-133346, dated Nov. 10, 2020 (w/ English machine translation).

Chinese Office Action for corresponding CN Application No. 202010439653.5, dated Dec. 29, 2021 (w/ English machine translation).

Office Action with Form PTO-892 Notice of References Cited issued by the United States Patent and Trademark Office for the parent U.S. Appl. No. 16/931,493, dated Jun. 24, 2022.

* cited by examiner

FIG. 3
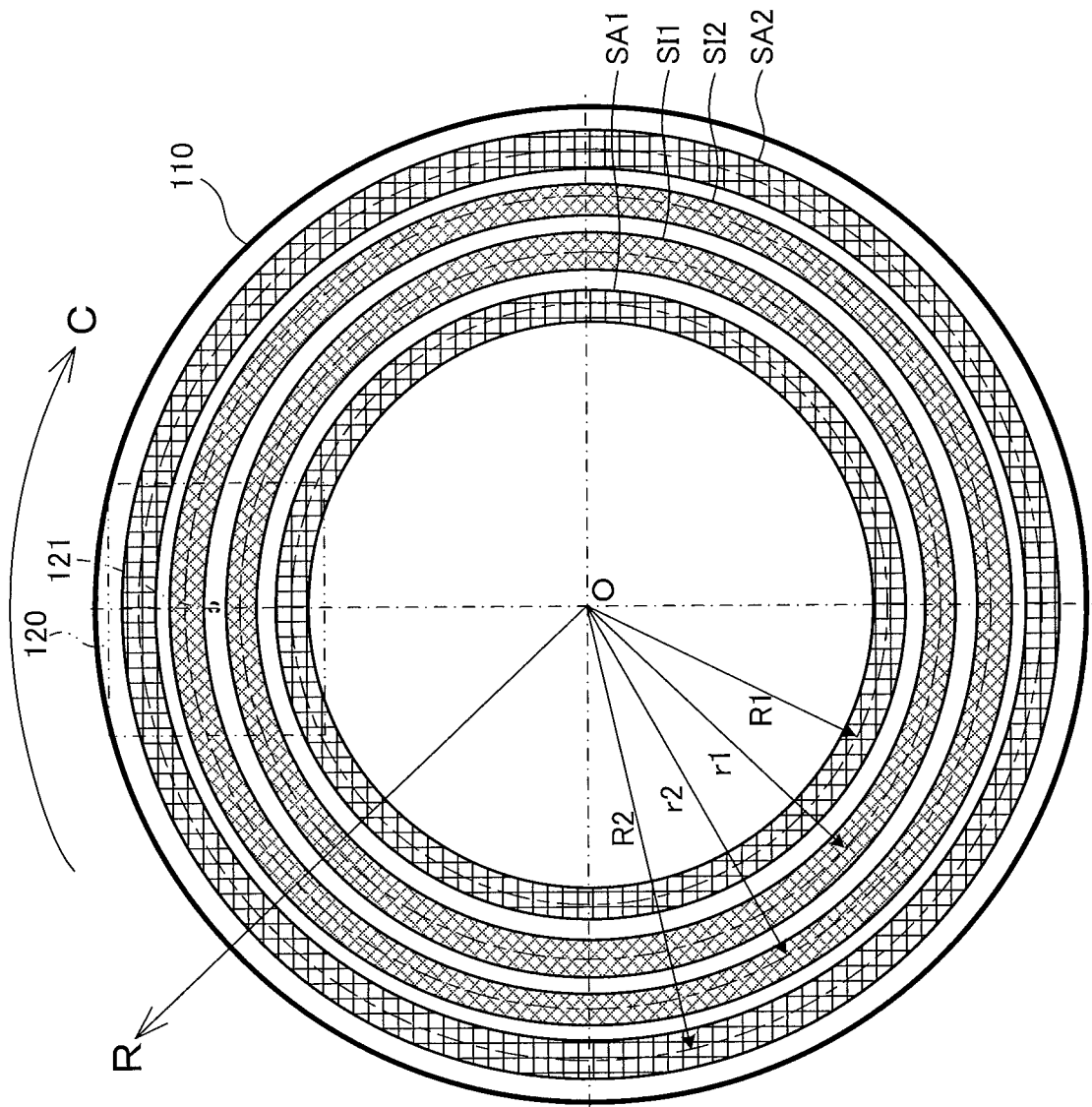
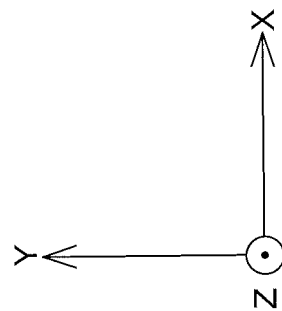

FIG. 8
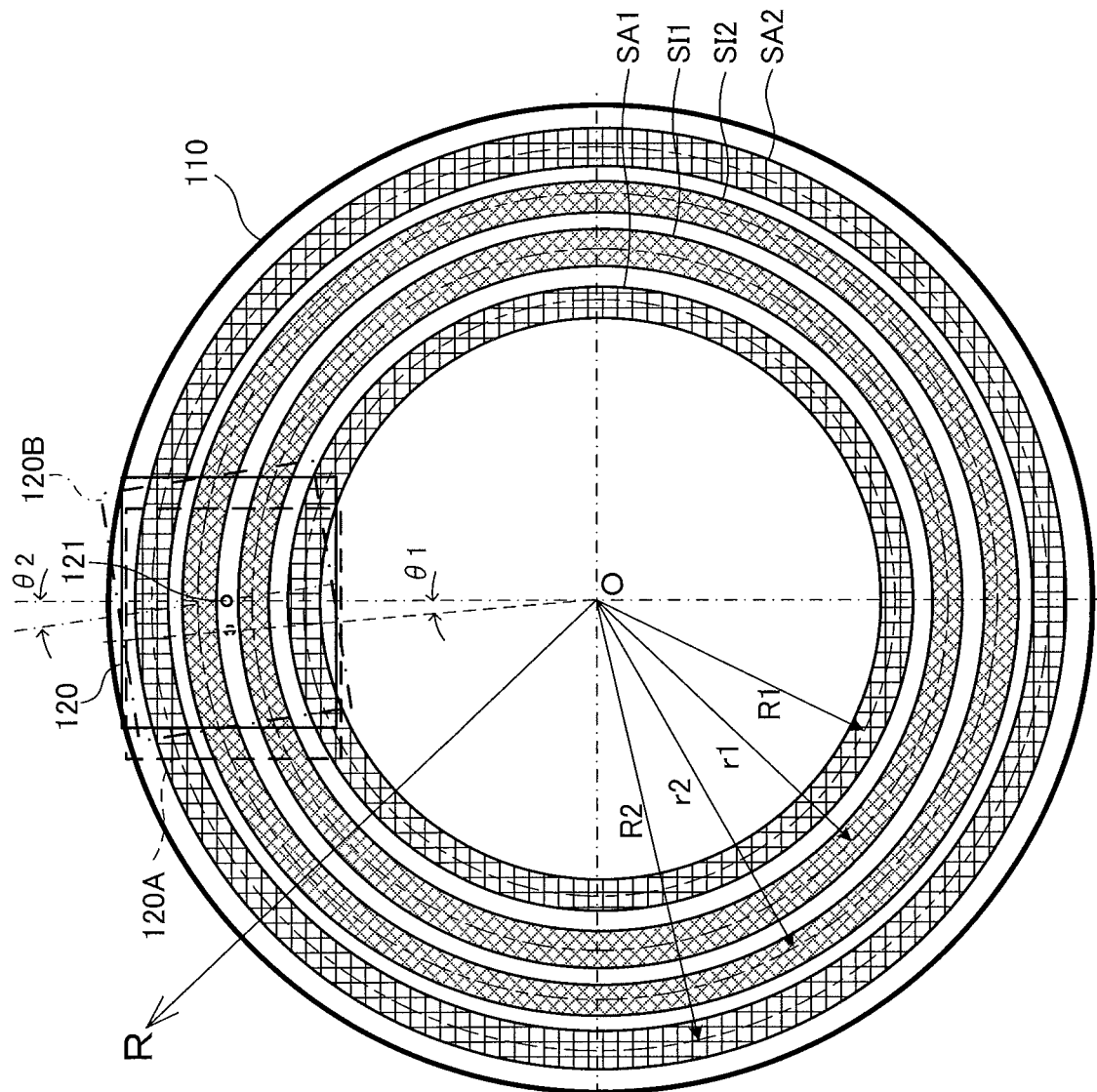
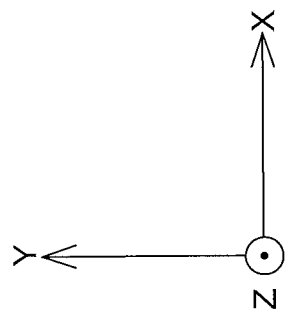

ENCODER, SERVO MOTOR, AND SERVO SYSTEM

CROSS-REFERENCE TO RELATED APPLICATIONS

The present application is a continuation application of the U.S. patent application Ser. No. 16/931,493, filed on Jul. 17, 2020, which claims priority under 35 U.S.C. § 119 to Japanese Patent Application No. 2019-133346, filed Jul. 19, 2019. The contents of these applications are incorporated herein by reference in their entirety.

BACKGROUND

Field of the Invention

The embodiments disclosed herein relate to an encoder, a servo motor, and a servo system.

Discussion of the Background

JP2012-103032A discloses an encoder that includes a first absolute light receiving array and a second absolute light receiving array. The first and second absolute light receiving arrays are aligned in a radial direction of a rotatable disc and face each other across a light source.

SUMMARY

According to one aspect of the present disclosure, an encoder includes a scale and a sensor. The scale is movable along a measurement direction and has a first absolute pattern and a second absolute pattern that are provided along the measurement direction. The sensor is configured to measure the first absolute pattern and a second absolute pattern when the scale moves along the measurement direction. The sensor includes a light source configured to emit light to the scale, a first absolute light receiver configured to receive the light transmitted through or reflected on the first absolute pattern of the scale, and a second absolute light receiver provided opposite to the first absolute light receiver with respect to an optical axis of the light source and configured to receive the light transmitted through or reflected on the second absolute pattern. The first absolute light receiver includes a plurality of first light receiving elements each configured to output a first absolute signal with a first phase when each of the plurality of first light receiving elements receives the light transmitted or reflected, and a plurality of second light receiving elements each configured to output a first absolute signal with a second phase different from the first phase when each of the plurality of second light receiving elements receives the light transmitted or reflected. Each of the plurality of first light receiving elements and each of the plurality of second light receiving elements are arranged alternately along the measurement direction. The second absolute light receiver includes a plurality of third light receiving elements each configured to output a second absolute signal with the first phase when each of the plurality of third light receiving elements receives the light transmitted or reflected, and a plurality of fourth light receiving elements each configured to output a second absolute signal with the second phase when each of the plurality of fourth light receiving elements receives the light transmitted or reflected. Each of the plurality of third light receiving elements and each of the plurality of fourth light receiving elements are arranged alternately along the measurement direction.

According to another aspect of the present disclosure, a servo motor includes a motor and the above-described encoder. The motor includes a stator and a movable member movable rotationally or linearly relative to the stator along a measurement direction. The encoder is configured to detect at least one of a position, a speed, and an acceleration of the movable member.

According to the other aspect of the present disclosure, a servo system includes a motor, the above-described encoder, and a control apparatus. The motor includes a stator and a movable member movable rotationally or linearly relative to the stator along a measurement direction. The encoder is configured to perform a detection of at least one of a position, a speed, and an acceleration of the movable member. The control apparatus is configured to control the motor based on the at least one of the position, the speed, and the acceleration of the movable member detected by the encoder.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is a top view of a disc illustrating an example configuration of the disc;

FIG. 8 is a top view of the disc illustrating an example positional deviation in the optical module;

DESCRIPTION OF THE EMBODIMENTS

Figure 1:
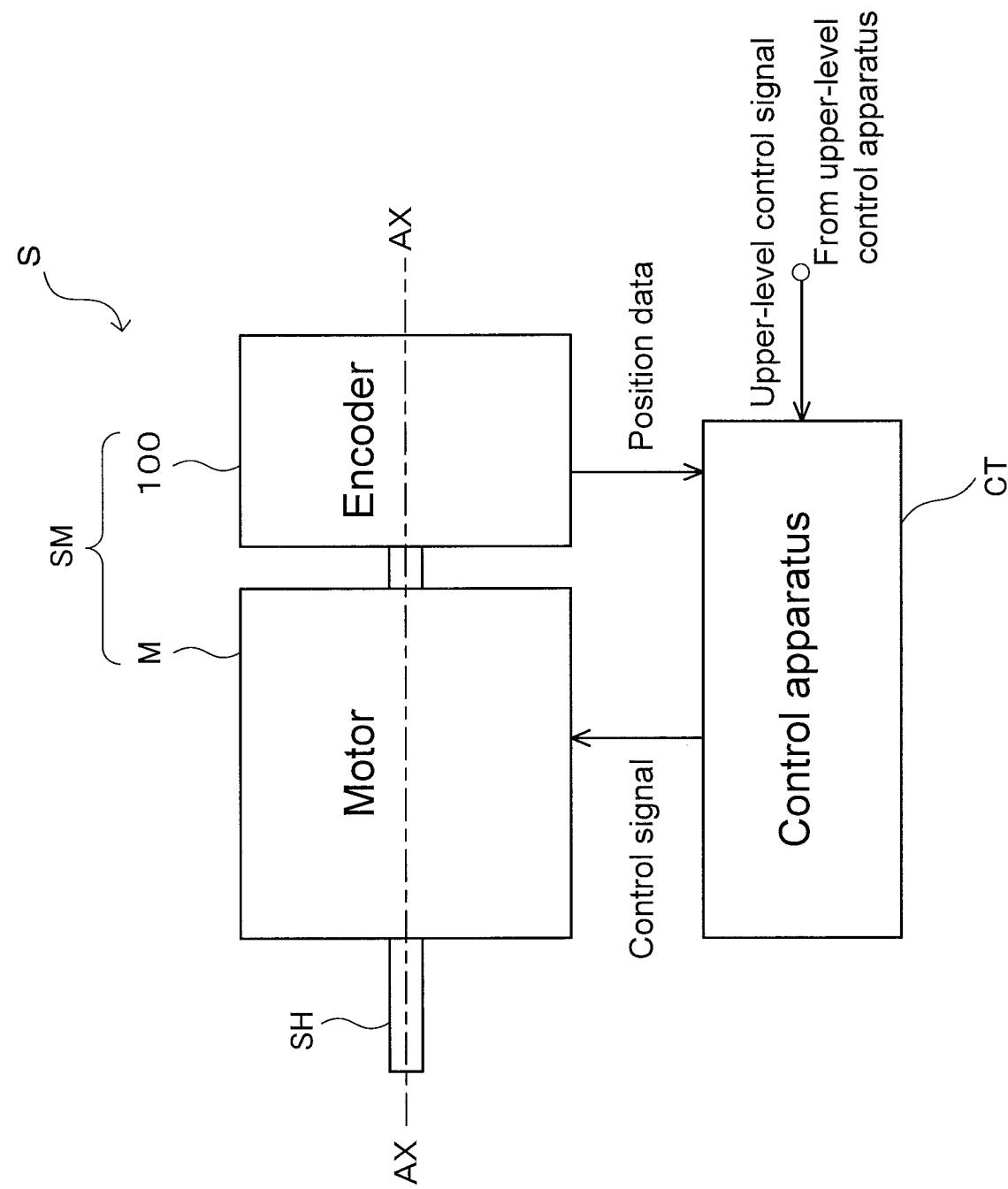
FIG. 1 is a schematic of an example configuration of a servo system according to an embodiment.

An embodiment will now be described with reference to the accompanying drawings, wherein like reference numerals designate corresponding or identical elements throughout the various drawings.
0. Facts Behind the Invention First, prior to a discussion of the embodiment, some facts about how the inventors conceived of the present disclosure will be described.

Some encoders reflect or transmit light at two slit tracks having different absolute patterns, receive the light at two light receiving arrays, and output absolute signals from the light receiving arrays. The absolute signals output from the two light receiving arrays are different from each other by a phase of 180° (degrees). With this configuration, if one of the absolute patterns is in an unstable region such as at a detection pattern changing point, the encoder selects a signal obtained from another absolute pattern positioned outside the unstable region, and identifies an absolute position based on the signal obtained. In this manner, an attempt is made to improve the accuracy with which the absolute position is detected.

In some encoders, a sensor provided with light receiving arrays is out of proper position relative to a scale provided with slit tracks in a circumferential direction of the encoder around the optical axis of the light source. In one example, in a case of a rotary motor including a stator and a rotor rotatable relative to the stator, a rotary type encoder may be used to detect at least one of a rotational angle, a rotational speed, and a rotational acceleration of the rotor. In this case, it is possible for a positional deviation of the sensor to occur, that is, the sensor may be out of proper position relative to the disc in the circumferential direction of the disc. In another example, in a case of a linear motor including a stator and a needle movable relative to the stator, a linear type encoder may be used to detect at least one of a position, a speed, and an acceleration of the needle. In this case, the needle may make shaky movements relative to the stator. Due to this or a similar situation, it is possible for a positional deviation of the sensor to occur, that is, the sensor may be out of position relative to the linear scale in the circumferential direction around the optical axis. In the above examples, the light receiving elements of the sensor are opposed to the slits of the scale at an angle. As a result, there may occur a phase discrepancy between the absolute signals output from the two light receiving arrays, creating a possibility that the accuracy with which the absolute position is detected is affected.

In this respect, the inventors conducted a study and, as a result, found out a configuration to minimize the influence of positional deviation of the sensor. Specifically, in this configuration, there are two light receiving arrays, each including a plurality of first light receiving elements and a plurality of second light receiving elements. Each of the plurality of first light receiving elements outputs a first absolute signal, and each of the plurality of second light receiving elements outputs a second absolute signal that is different from the first absolute signal by a phase of 180°. Each of the plurality of second light receiving elements is aligned alternately with one of the plurality of first light receiving elements along the measurement direction of the scale. The two light receiving arrays are opposed to each other across the optical axis of the light source. With this configuration taken into consideration, the inventors further conducted a study and, as a result, conceived of the encoder, the servo motor, and the servo system according to the embodiment. This embodiment will be described in detail below. It is to be noted that the above-described circumstances under which the embodiment has been made are presented for example purposes only, and it will be readily appreciated that the embodiment provides other advantageous effects than those described herein.

While the encoder described below according to the embodiment is applicable to rotary type encoders and linear type encoders, a rotary encoder will be taken as an example in the following description. The following description, however, also applies in a linear type encoder example, with suitable changes made to some elements, such as the rotatable disc being changed to a linear scale as a measurement target of the sensor. In light of this, a linear type encoder example will not be elaborated upon here.

1. Servo System

By referring to FIG. 1, a configuration of a servo system S according to this embodiment will be described. As illustrated in FIG. 1, the servo system S includes a servo motor SM and a control apparatus CT. The servo motor SM includes an encoder 100 and a motor M.

The motor M is a non-limiting example of a power source, excluding the encoder 100. The motor M is a rotary type motor, in which the rotor (not illustrated) rotates relative to the stator (not illustrated) to cause a shaft SH, which is fixed to the rotor, to rotate about the axis AX, thereby outputting rotational force.

As used herein, the term "servo motor SM" is intended to mean a configuration including the motor M and the encoder 100, although a motor alone may be regarded as a servo motor in some ways of terminology. For convenience of description, the servo motor SM is described as a motor controlled to follow a target value indicating rotational angle, speed, or another parameter. The servo motor SM, however, also encompasses motors used in other than servo system applications insofar as these motors are provided with encoders; a possible application is that the output of the encoder is used only for display purposes.

It is also to be noted that there is no particular limitation to the motor M insofar as position data or other data of the motor M is detectable by the encoder 100. It is also to be noted that the motor M will not be limited to an electric motor, which uses electricity as motive power; other examples of the motor M include a hydraulic motor, a pneumatic motor, and a steam motor, all of which uses other than electricity as motive power. In the following description, the motor M will be described as an electric motor.

The encoder 100 is connected to an end portion of the shaft SH of the motor M opposite to another end portion of the shaft SH from which rotational force is output. This configuration, however, is not intended in a limiting sense; the encoder 100 may be connected to the end portion of the shaft SH from which rotational force is output. By detecting a position of the shaft SH (rotor), the encoder 100 detects a position (also referred to as rotational angle) of the motor M, and outputs position data indicating the position.

The encoder 100 may detect, in addition to or instead of the position of the motor M, at least one of a speed of the motor M (also referred to as rotational speed or angular speed) and an acceleration of the motor M (also referred to as rotational acceleration or angular acceleration). In this case, the speed and acceleration of the motor M may be detected by, for example: obtaining a single or double derivative of the position with respect to time; or counting detection signals (for example, incremental signals, described later) for a predetermined period of time. In the following description, position will be taken as a physical quantity example detected by the encoder 100.

The control apparatus CT obtains position data output from the encoder 100 and controls the rotation of the motor M based on the position data. Thus, in this embodiment, in which the motor M is an electric motor, the control apparatus CT uses position data to control current, voltage, or another form of energy applied to the motor M, thereby controlling the rotation of the motor M. Another possible example is that the control apparatus CT obtains an upper-level control signal from an upper-level control apparatus, and controls the motor M so that a rotational force that realizes the position or another parameter specified by the upper-level control signal is output from the shaft SH of the motor M. In applications in which the motor M is a hydraulic motor, a pneumatic motor, a steam motor, or another motor driven by a form of motive power other than electricity, the control apparatus CT may control the supply of the motive power to control the rotation of the motor M.

2. Encoder

Figure 2:
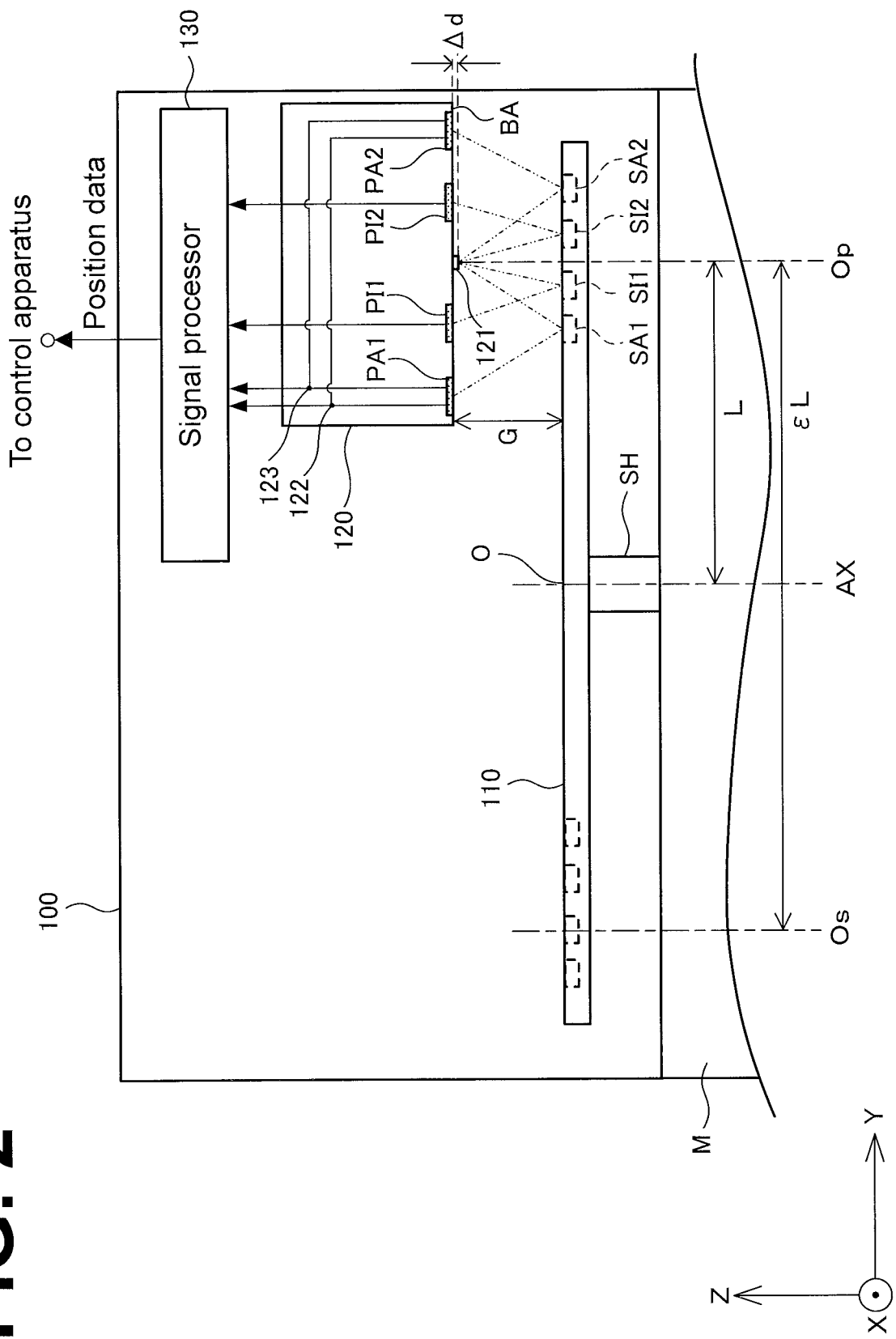
FIG. 2 is a schematic of an example configuration of an encoder according to an embodiment.

The encoder 100 according to the embodiment will be described. As illustrated in FIG. 2, the encoder 100 includes a disc 110, an optical module 120, and a signal processor 130.

By way of description of the structure of the encoder 100, "up", "down", and other direction-indicating terms used in the following description will be defined as follows. Referring to FIG. 2, the direction in which the disc 110 faces the optical module 120, that is, the Z positive direction is defined as "up" and "upward", and the Z negative direction is defined as "down" and "downward". It is to be noted, however, that these directions depend on how the encoder 100 is installed and, therefore, is not intended as limiting relative positions of the components of the encoder 100.

2-1. Disc

The disc 110 is a non-limiting example of the scale recited in the appended claims. As illustrated in FIG. 3, the disc 110 has a circular plate shape with a disc center O, which approximately matches axis AX. The disc 110 is connected to the shaft SH of the motor M and is rotatable by the rotation of the shaft SH. Thus, in this embodiment, the disc 110, which has a circular plate shape, is taken as a measurement target example used to measure a rotational angle of the motor M. Another possible example is that another member or portion, such as an end surface of the shaft SH, is used as the measurement target. Also, while in the example illustrated in FIG. 2 the disc 110 is directly connected to the shaft SH, the disc 110 may be connected to the shaft SH via a connection member such as a hub.

As illustrated in FIG. 3, the disc 110 includes a plurality of slit tracks SA1, SI1, SI2, and SA2. While the disc 110 is rotated by driving the motor M into rotation, the optical module 120 is provided at a fixed position while facing a part of the disc 110. That is, while the motor M is being driven into rotation, the slit tracks SA1, SI1, SI2, and SA2 move relative to the optical module 120 along a measurement direction (which is the direction indicated by the arrow C in FIG. 3 and which will be denoted "measurement direction C").

As used herein, the term "measurement direction" refers to a direction in which the optical module 120 optically measures the slit tracks formed on the disc 110. In rotary encoder applications, in which the measurement target is a rotary disc (as in the disc 110 of this embodiment), the measurement direction C corresponds to a circumferential direction of the disc 110 around its disc center O. In linear encoder applications, in which the measurement target is a linear scale, the measurement direction C corresponds to a line direction along the linear scale.

Each of the slit tracks SA1, SI1, SI2, and SA2 has a ring shape that is formed on the upper surface of the disc 110 and centered around the disc center O. Each slit track also includes a plurality of reflection slits aligned along the measurement direction C throughout the circumference of the track (see portions shaded by crossing lines in FIG. 4). Each of the plurality of reflection slits reflects light emitted from a light source 121.

The disc 110 is made of light reflecting material, such as metal. The light reflecting material is subjected to etching or another processing to apply low reflectance material (such as chromium oxide) to non-reflecting portions of the disc 110. The reflection slits are formed at portions of the disc 110 other than the non-reflecting portions. Another possible example is that the non-reflecting portions are formed by forming low reflectance portions by roughening portions of the light reflecting material, and the reflection slits are formed at other than the roughened portions.

It is to be noted that the above-described material of the disc 110 and method of producing the disc 110 are not intended in a limiting sense. Other possible examples of the material of the disc 110 are glass, transparent resin, and other light transmitting material. In this case, the reflection slits may be formed by applying light reflecting material (such as chromium) to the disc 110 by, for example, deposition.

As used herein, the term "slit" refers to an area formed on the disc 110 that causes an effect on light emitted from the light source 121. Examples of the effect include, but are not limited to, a reflection (which encompasses a reflection-type diffraction) and a transmission (which encompasses a transmission-type diffraction). A plurality of such slits are aligned along the measurement direction C to form a predetermined pattern, which is a slit track. In the following description of this embodiment, a reflection slit is used as a slit example.

On the upper surface of the disc 110, there are slit tracks aligned in a width direction of the disc 110 (which is the direction indicated by the arrow R illustrated in FIG. 3 and which will be hereinafter referred to as "width direction R"). As used herein, the term "width direction" refers to a radial direction of the disc 110, that is, a direction approximately perpendicular to the measurement direction C. The length of each slit track along the width direction R corresponds to the width of each slit track. The four slit tracks are concentric slit tracks and aligned in the order of SA1, SI1, SI2, and SA2 from the negative width direction R toward the positive width direction R. Each slit track will be described in more detail by referring to FIG. 4, which is a partially enlarged view of a portion of the disc 110 facing the optical module 120.

Figure 4:
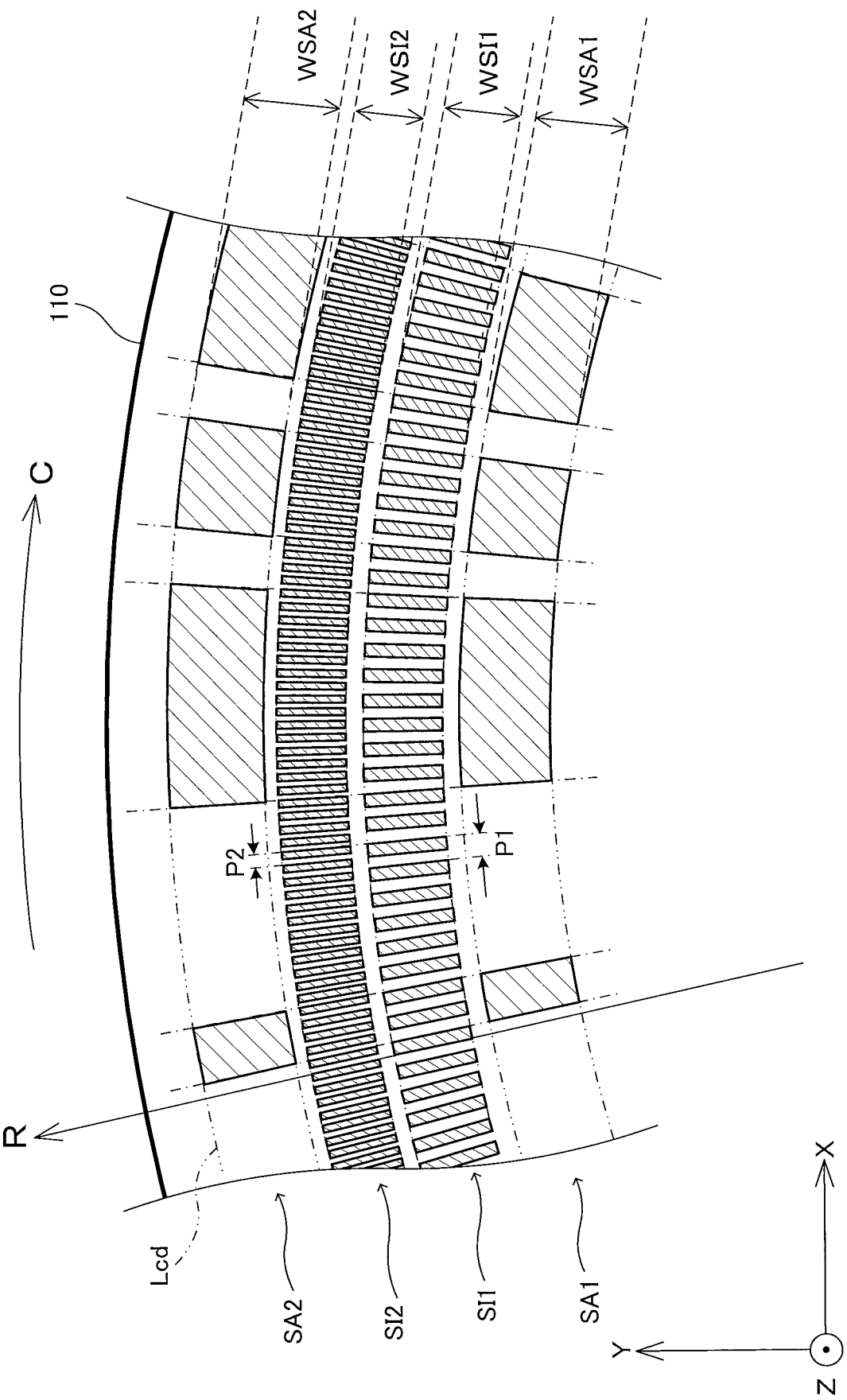
FIG. 4 is a partially enlarged view of the upper surface of the disc illustrating an example configuration of a slit track.

As illustrated in FIG. 4, the plurality of reflection slits of the slit tracks SA1 and SA2 are aligned throughout the circumference of the disc 110 along the measurement direction C and form absolute patterns.

When a slit track faces a light receiving array, described later, of the optical module 120 over an angle of area in the full circumference of the disc 110, the absolute pattern of the reflection slit within the angle of area unambiguously shows the position or ratio of a reflection slit within the angle. More specifically, referring to an absolute pattern illustrated in FIG. 4, when the motor M is located at a particular angle position, the plurality of light receiving elements of the light receiving array facing the slit track generate a combination of bit patterns each indicating a reflection-slit detection or un-detection. This combination unambiguously shows an absolute position corresponding to the angle position. As used herein, the term "absolute position" refers to an angle position on the full circumference of the disc 110 relative to an origin of the disc 110. The origin of the disc 110 is set at a convenient angle position on the full circumference of the disc 110, and the absolute pattern is formed based on the origin.

The absolute pattern according to this embodiment one-dimensionally shows the absolute position of the motor M using a number of bits corresponding to the number of the light receiving elements of the light receiving array. This configuration, however, is not intended as limiting the absolute pattern. For example, the absolute pattern may multi-dimensionally show the absolute position of the motor M using a number of bits corresponding to the number of the light receiving elements. Otherwise, the absolute pattern may not necessarily be a predetermined bit pattern. For example, it is possible to use: a pattern of the amount of light received at the light receiving elements or a physical quantity such as phase such that the pattern is variable to one-dimensionally show an absolute position; a pattern in which an absolute pattern is modulated in code sequence; or any of other various patterns.

In this embodiment, two slit tracks SA1 and SA2 have the same absolute patterns formed at corresponding positions in the measurement direction C. That is, one slit of the slit track SA1 and one slit of the slit track SA2 corresponding to the one slit of the slit track SA1 match in their circumferential direction ends (end positions in the measurement direction C).

In contrast, the plurality of reflection slits of the slit tracks SI1 and 512 have incremental patterns and are aligned throughout the circumference of the disc 110 along the measurement direction C.

As used herein, the term "incremental pattern" is intended to mean a pattern of reflection slits repeated at regular pitches, as illustrated in FIG. 4. As used herein, the term "pitch" is intended to mean the interval at which two adjacent reflection slits of each of the slit tracks SI1 and SI2, which have incremental patterns, are provided. As illustrated in FIG. 4, the slit track SI1 has a pitch of P1, and the slit track SI2 has a pitch of P2. As described above, an absolute pattern shows an absolute position in the form of bits each indicating a reflection-slit detection or un-detection at the plurality of light receiving elements. As opposed to an absolute pattern, an incremental pattern shows the position of the motor M on a one-pitch basis or within one pitch in the form of the sum of detection signals from one or more of the light receiving elements. Thus, an incremental pattern does not show an absolute position of the motor M, but shows a position more accurately than an absolute pattern.

In this embodiment, the pitch P1 of the slit track SI1 is longer than the pitch P2 of the slit track SI2; for example, P1=2×P2. In other words, the number of the reflection slits of the slit track SI2 is twice the number of the reflection slits of the slit track SI1. This slit pitch configuration, however, is not intended in a limiting sense; in other non-limiting examples, the number of the reflection slits of the slit track SI2 may be 3 times, 4 times, or 5 times the number of the reflection slits of the slit track SI1.

In this embodiment, the minimal length of a reflection slit of the slit tracks SA1 and SA2 in the measurement direction C is equal to the reflection-slit pitch P1 of the slit track SI1. That is, absolute signal resolution based on the slit tracks SA1 and SA2 corresponds to the number of the reflection slits of the slit track SI1.

2-2. Optical Module

Figure 5:
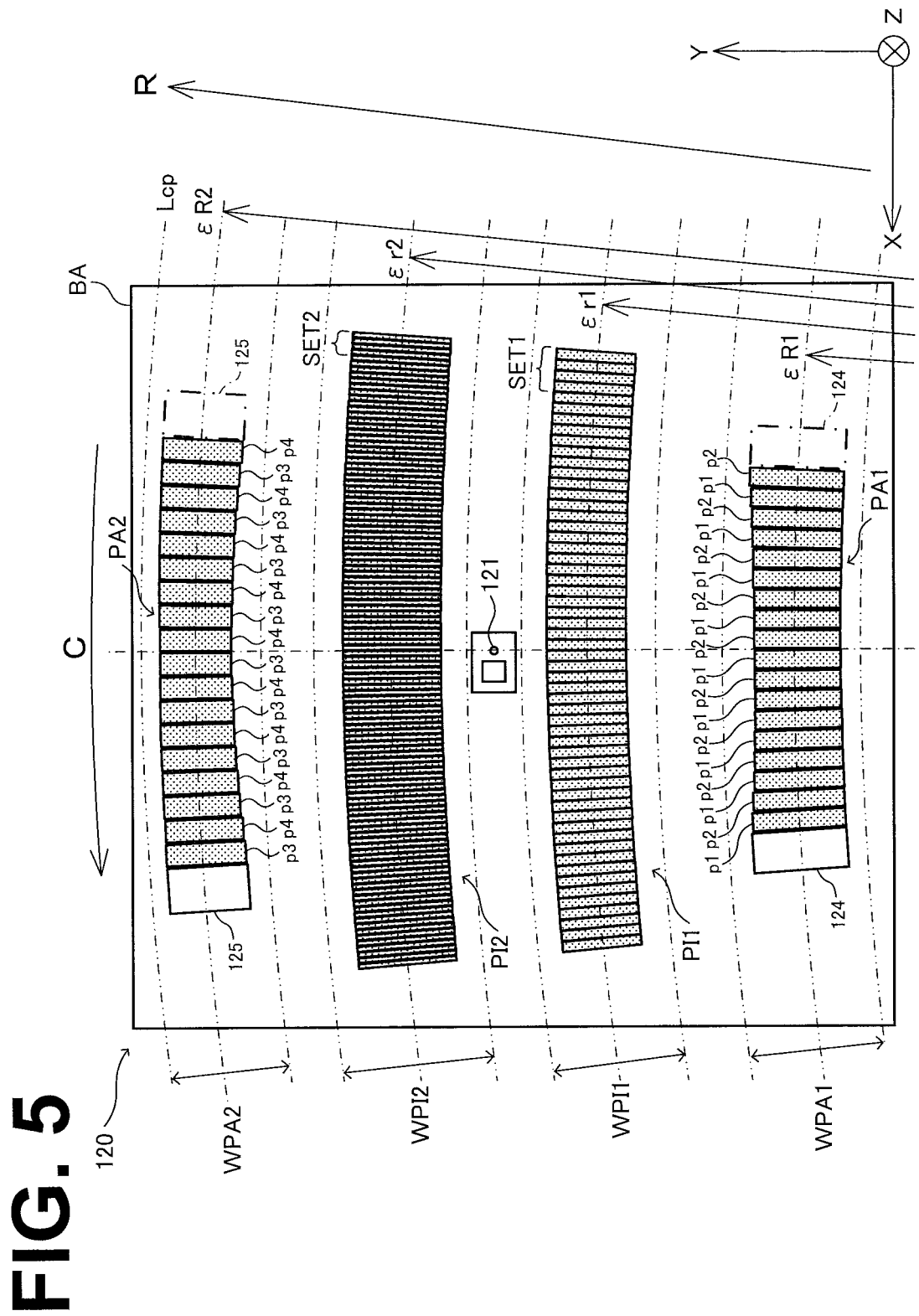
FIG. 5 is a bottom side view of the disc illustrating an example layout of a light source of an optical module and light receiving arrays.

The optical module 120 is a non-limiting example of the sensor recited in the appended claims. As illustrated in FIGS. 2 and 5, the optical module 120 is implemented in the form of a substrate BA, which is parallel to the disc 110. Together with the rotation of the disc 110, the optical module 120 moves along the measurement direction C relative to the slit tracks SA1, SI1, SI2, and SA2. It is to be noted that the optical module 120 may not necessarily be a single substrate but may be made up of a plurality of substrates. In this case, these substrates may be integrated into the optical module 120. It is to be noted that the optical module 120 may not necessarily have a substrate shape.

As illustrated in FIGS. 2 and 5, the optical module 120 includes the light source 121 and a plurality of light receiving arrays PA1, PI1, PI2, and PA2. The light source 121 and the light receiving arrays PA1, PI1, PI2, and PA2 are provided on the surface of the substrate BA facing the disc 110.

As illustrated in FIG. 3, the light source 121 is provided at a position facing the space between the slit track SI1 and the slit track SI2, and emits light toward portions of the disc 110 that face the optical module 120 and that the four slit tracks SA1, SI1, SI2, and SA2 pass.

There is no particular limitation to the light source 121 insofar as the light source 121 is capable of irradiating a radiated region with light. A non-limiting example of the light source 121 is an LED (Light-Emitting Diode). The light source 121 is a point light source with no optical lens, and has a light emitting portion that emits diffused light. As used herein, the term "point light source" is intended to encompass a light source that emits any other form of light, as well as a light source that emits a point of light in a strict sense. That is, in design viewpoints and/or in operation principle viewpoints, any light source that emits light from a light exit surface small in area enough to be regarded as approximately punctiform is encompassed within the meaning of the point light source in this embodiment. Also as used herein, the term "diffused light" is intended to encompass any other form of light emitted from the point light source, as well as omni-directional light. That is, any form of light diffused in finite, constant directions is encompassed within the meaning of the diffused light in this embodiment. In other words, any form of light more diffusible than parallel light is encompassed within the meaning of the diffused light in this embodiment. Using such point light source, the light source 121 is capable of emitting light approximately uniformly to the four slit tracks SA1, SI1, SI2, and SA2 while they are passing positions that face the light source 121. Additionally, the light source 121 does not concentrate or diffuse the light using an optical element, ensuring that an error or like occurrences attributed to an optical element is difficult to occur. As a result, the straightness of the light toward the slit tracks increases.

The plurality of light receiving arrays PA1, PI1, PI2, and PA2 are arranged around the light source 121, and each of the light receiving arrays PA1, PI1, PI2, and PA2 includes a plurality of light receiving elements (see portions shaded by dots in FIG. 5). Each of the plurality of light receiving elements corresponds to one reflection slit of one slit track, and receives light reflected from the reflection slit of the one reflection slit. As illustrated in FIG. 5, the plurality of light receiving elements are aligned along the measurement direction C. A non-limiting example of each light receiving element is a photodiode. It is to be noted, however, that a photodiode is not intended in a limiting sense, and any other element or device is possible insofar as the light receiving element is capable of receiving light emitted from the light source 121 and converting the light into an electrical signal.

It is to be noted that the light emitted from the light source 121 is diffused light. Because of diffused light, when a slit track is projected on the optical module 120, the image of the slit track is an image enlarged by a predetermined enlargement ratio of ε, which is based on the optical path length. More specifically, as illustrated in FIGS. 4 and 5, the slit tracks SA1, SI1, SI2, and SA2 have lengths of WSA1, WSI1, WSI2, and WSA2, respectively, in the width direction R. When beams of light are reflected on the slit tracks SA1, SI1, SI2, and SA2 and projected on the optical module 120, the beams of light corresponding to the slit tracks SA1, SI1, SI2, and SA2 have lengths of WPA1, WPI1, WPI2, and WPA2, respectively, in the width direction R. In this case, WPA1, WPI1, WPI2, and WPA2 are ε times WSA1, WSI1, WSI2, and WSA2, respectively. It is to be noted in this embodiment that the width-direction center of each light receiving array approximately matches the width-direction center of the projected shape of the corresponding slit on the optical module 120; and the R-direction length of the projected shape of the each slit on the optical module 120 is larger than the R-direction length of the corresponding light receiving element by a predetermined amount, as illustrated in FIG. 5. This predetermined amount is set at a value large enough to ensure that even if the optical module 120 has a positional deviation in the circumferential direction around the optical axis, the light receiving array is included within the projected shape of the slit.

A similar discussion applies in the measurement direction C on the optical module 120; that is, when a length of an element of the disc 110 in the measurement direction C is projected on the optical module 120, the projected shape is a shape enlarged by an enlargement ratio of E. A case of the measurement direction C will be described in more detail by referring to the position of the light source 121 illustrated in FIG. 2. The measurement direction C on the disc 110 is a direction along a circle centered around the axis AX. In contrast, the center of the measurement direction C projected on the optical module 120 is displaced from the optical axis, Op, of the light source 121 in the radial direction of the disc 110 by a distance of εL. The distance εL is a distance obtained by enlarging the distance, L, between the axis AX and the optical axis Op by an enlargement ratio of ε. The position corresponding to the enlargement is schematically illustrated as measurement center Os in FIG. 2. Thus, the measurement direction C on the optical module 120 is defined by a line that: is centered around the measurement center Os, which is away from the optical axis Op by a distance of εL along a line that passes the optical axis Op and the axis AX and extends toward the axis AX; and has a radius of εL.

As illustrated in FIGS. 4 and 5, arcuate lines Lcd and Lcp indicate a relationship between the measurement direction C on the disc 110 and the measurement direction C on the optical module 120. The line Lcd, which is illustrated in FIG. 4, indicates a line on the disc 110 along the measurement direction C. The line Lcp, which is illustrated in FIG. 5, indicates a line on the substrate BA along the measurement direction C (a line equivalent to the line Lcd projected on the optical module 120).

As illustrated in FIG. 2, G denotes the gap length between the optical module 120 and the disc 110, and Δd denotes the length by which the light source 121 protrudes from the substrate BA. Using these parameters, the enlargement ratio ε can be represented by Equation 1.

$$\varepsilon = (2G - \Delta d)/(G - \Delta d) \qquad \text{Equation 1}$$

The light receiving arrays PA1, PI1, PI2, and PA2 according to this embodiment respectively correspond to the four slit tracks SA1, SA2, SI1, and SI2. Specifically, the light receiving array PA1 receives light reflected on the slit track SA1; the light receiving array PA2 receives light reflected on the slit track SA2; the light receiving array PI1 receives light reflected on the slit track SI1; and the light receiving array PI2 receives light reflected on the slit track SI2.

As illustrated in FIG. 3, the slit track SA1 has a center radius of R1; the slit track SI1 has a center radius of r1; the slit track SI2 has a center radius of r2; and the slit track SA2 has a center radius of R2. As illustrated in FIG. 5, in the optical module 120, the light receiving array PA1 has a center radius (radius centered around the measurement center Os) of εR1; the light receiving array PI1 has a center radius of εR1; the light receiving array PI2 has a center radius of εr2; and the light receiving array PA2 has a center radius of εr2.

The light source 121, the light receiving arrays PA1 and PA2, and the light receiving arrays PI1 and PI2 are provided in the arrangement illustrated in FIG. 5. Specifically, the light receiving arrays PA1 and PA2, which have absolute patterns, face each other across the light source 121 in the width direction R. In the example illustrated in FIG. 5, the light receiving array PA1 is provided on the inside in the width direction R, and the light receiving array PA2 is provided on the outside in the width direction R. In this embodiment, the light receiving arrays PA1 and PA2 are provided at approximately equal distances from the light source 121. The light receiving arrays PI1 and PI2, which have incremental patterns, are provided between the light receiving array PA1 and the light receiving array PA2 and face each other across the light source 121 in the width direction R. In the example illustrated in FIG. 5, the light receiving array PI1 is provided on the inside in the width direction R, and the light receiving array PI2 is provided on the outside in the width direction R. In this embodiment, the light receiving arrays PI1 and PI2 are provided at approximately equal distances from the light source 121. Thus, the light receiving array PA1, the light receiving array PI1, the light source 121, the light receiving array PI2, and the light receiving array PA2 are aligned in this order from the inside toward the outside in the width direction R.

The light receiving array PA1 (which is a non-limiting example of the first absolute light receiver recited in the claims) includes 18 light receiving elements p1 and p2; receives light reflected on the slit track SA1 (which is a non-limiting example of the first absolute pattern recited in the claims); and outputs a first absolute signal having a bit pattern equivalent to half the number of the light receiving elements (in this embodiment, 9). In the light receiving array PA1, the plurality of first light receiving elements p1 and the plurality of second light receiving elements p2 are aligned in series and alternately along the measurement direction C. Each of the first light receiving elements p1 outputs a first absolute signal having a first phase, and each of the second light receiving elements p2 outputs a first absolute signal having a second phase. It is to be noted that the plurality of first light receiving elements p1, which are aligned along the measurement direction C, are different from each other in phase (channel), and the plurality of second light receiving elements p2, which are aligned along the measurement direction C, are different from each other in phase (channel). To avoid complicated description in FIG. 5, however, the first light receiving elements p1 are denoted using the same symbol, and the second light receiving elements p2 are denoted using the same symbol (the same applies in FIGS. 9 and 15, described later). In the example illustrated in FIG. 5, the location pitch of the light receiving element p1 and the location pitch of the light receiving element p2 correspond to the minimal length (the pitch P1) of the reflection slit of the slit track SA1 in the measurement direction C (the minimal length in the projected image, which is $\varepsilon \times P1$). The length of each of the light receiving elements p1 and p2 in the measurement direction C is approximately half $\varepsilon \times P1$. With this configuration, the light receiving elements p1 and p2 are offset from each other in the measurement direction C by a length equivalent to half a bit (corresponding to half the pitch P1). As a result, the first phase and the second phase are different in phase from each other by an electrical angle of 180° (where one period of the incremental signal output from the light receiving array PI1 is assumed 360°).

The light receiving array PA2 (which is a non-limiting example of the second absolute light receiver recited in the claims) includes 18 light receiving elements p3 and p4; receives light reflected on the slit track SA2 (which is a non-limiting example of the second absolute pattern recited in the claims); and outputs a second absolute signal having a bit pattern equivalent to half the number of the light receiving elements (in this embodiment, 9). In the light receiving array PA2, the plurality of third light receiving elements p3 and the plurality of fourth light receiving elements p4 are aligned at predetermined pitches, in series, and alternately along the measurement direction C. Each of the third light receiving elements p3 outputs a second absolute signal having a first phase, and each of the fourth light receiving elements p4 outputs a second absolute signal having a second phase. It is to be noted that the plurality of third light receiving elements p3, which are aligned along the measurement direction C, are different from each other in phase (channel), and the plurality of fourth light receiving elements p4, which are aligned along the measurement direction C, are different from each other in phase (channel). To avoid complicated description in FIG. 5, however, the third light receiving elements p3 are denoted using the same symbol, and the fourth light receiving elements p4 are denoted using the same symbol (the same applies in FIGS. 9 and 15, described later). In the example illustrated in FIG. 5, the location pitch of the light receiving element p3 and the location pitch of the light receiving element p4 correspond to the minimal length (the pitch P1) of the reflection slit of the slit track SA2 in the measurement direction C (the minimal length in the projected image, which is $\varepsilon \times P1$). The length of each of the light receiving elements p3 and p4 in the measurement direction C is approximately half $\varepsilon \times P1$. With this configuration, the light receiving elements p3 and p4 are offset from each other in the measurement direction C by a length equivalent to half a bit (corresponding to half the pitch P1).

Thus, the light receiving array PA1 outputs two phase-shifted absolute signals, and the light receiving array PA2 outputs two phase-shifted absolute signals. This configuration provides various advantageous effects, some of which will be described below. In applications in which one-dimensional absolute patterns are used to show absolute positions (as in this embodiment), there is a possibility that the accuracy with which the absolute position is detected is degraded, especially in bit-pattern transition regions, in which the light receiving elements of the light receiving array PA1 or the light receiving array PA2 face end portions of the reflection slits. In this embodiment, the light receiving elements p1 and p2 of the light receiving array PA1 are offset from each other by a length equivalent to half a bit, and the light receiving elements p3 and p4 of the light receiving array PA2 are offset from each other by a length equivalent to half a bit. For example, if the absolute position corresponding to the light receiving element p1 of the light receiving array PA1 (or the light receiving element p3 of the light receiving array PA2) corresponds to a bit-pattern transition region, it is possible to use a detection signal from the light receiving element p2 of the light receiving array PA1 (or the light receiving element p4 of the light receiving array PA2) to calculate an absolute position. This configuration improves the accuracy with which the absolute position is detected.

It is to be noted that in the above-described configuration, it is preferable to make the circuit configuration and/or signal processing simple by using a common threshold value to convert the output signals from the light receiving elements into binary signals. For this purpose, it is preferable to make the output signals from the light receiving element p1 and the light receiving element p2 (or the light receiving element p3 and the light receiving element p4) substantially same in magnitude. Specifically, a signal in which the output signal from the light receiving element p1 and the output signal from the light receiving element p3 are combined is preferably approximately uniform on a channel basis. Similarly, a signal in which the output signal from the light receiving element p2 and the output signal from the light receiving element p4 are combined is preferably approximately uniform on a channel basis. In this embodiment, as the light receiving elements p1 and p2 (or the light receiving elements p3 and p4) are farther away from the light source 121, the light receiving elements p1 and p2 (or the light receiving elements p3 and p4) have a larger light receiving area (that is, are longer in the width direction R). This ensures that the amount of light received at the light receiving elements p1 and p3 (the sum of light intensities at the light receiving points in the light receiving area) and the amount of light received at the light receiving elements p2 and p4 are approximately uniform on a channel basis. In this manner, the above-described configuration is realized.

As illustrated in FIG. 2, the optical module 120 includes a first signal combiner 122 and a second signal combiner 123. The first signal combiner 122 combines the first absolute signal having the first phase and the second absolute signal having the first phase to generate a first phase signal. The second signal combiner 123 combines the first absolute signal having the second phase and the second absolute signal having the second phase to generate a second phase signal. The first phase signal will be occasionally referred to as "A phase absolute signal", and the second phase signal will be occasionally referred to as "B phase absolute signal". As used herein, the terms "A phase absolute signal" and "B phase absolute signal" are intended to mean signals that are different in phase from each other by an electrical angle of 180° (where one period of the incremental signal output from the light receiving array P11 is assumed 360°). The first signal combiner 122 is a signal wire (not illustrated) that is formed on the substrate BA and that electrically connects the light receiving element p1 of the light receiving array PA1 to the light receiving element p3 of the light receiving array PA2. Similarly, the second signal combiner 123 is a signal wire (not illustrated) that is formed on the substrate BA and that electrically connects the light receiving element p2 of the light receiving array PA1 to the light receiving element p4 of the light receiving array PA2.

It is to be noted that the first signal combiner 122 and the second signal combiner 123 may be implemented in other than signal wire forms. For example, it is possible to extend portions of the light receiving elements p1 and p3 and connect the extended portions to each other; similarly, it is possible to extend portions of the light receiving elements p2 and p4 and connect the extended portions to each other. With this configuration, absolute signals are combined within the light receiving elements. It is also possible to: output phase-shifted absolute signals from the light receiving elements p1 and p3; output phase-shifted absolute signals from the light receiving elements p2 and p4; and combine the absolute signals through signal processing performed at the signal processor 130.

The above-described configuration ensures that even if there is a positional deviation of the optical module 120 in the circumferential direction around the optical axis Op, a phase discrepancy between the first absolute signal and the second absolute signal caused by the positional deviation is canceled. Thus, the influence of the positional deviation and/or phase discrepancy is minimized.

It is to be noted that in order to more accurately cancel the phase discrepancy between the first absolute signal and the second absolute signal by combining the above-described signals, it is preferable to make the first absolute signal (output from the light receiving array PA1) identical in magnitude (for example, amplitude, voltage, or current) to the second absolute signal (output from the light receiving array PA2). In this embodiment, as the light receiving elements p1 and p2 (or the light receiving elements p3 and p4) are farther away from the light source 121, the light receiving elements p1 and p2 (or the light receiving elements p3 and p4) have a larger light receiving area (that is, are longer in the width direction R). This ensures that the amount of light (the sum of light intensities at the light receiving points in the light receiving area) received at the light receiving element p1 and the light receiving element p3 in the same channel (or the light receiving element p2 and the light receiving element p4 in the same channel) is approximately uniform. In this manner, the above-described configuration is realized. It is to be noted that the method of making approximately uniform the amount of light received may be other than the adjustment of the light receiving areas of the light receiving elements p1 and p3 (or the light receiving elements p2 and p4). Other possible examples include, but are not limited to: adjusting the positions of the light receiving elements p1 and p3 (or the light receiving elements p2 and p4); and adjusting gain of the light receiving elements p1 and p3 (or the light receiving elements p2 and p4). It is to be noted, however, that the adjustment of the light receiving areas (as employed in this embodiment) is a space-saving method in that it is not necessary to provide additional circuitry and/or empty space.

The light receiving array PI1, which corresponds to an incremental pattern, is provided between the light receiving array PA1 and the light source 121. The light receiving array PI2, which corresponds to an incremental pattern, is provided between the light source 121 and the light receiving array PA2. The light receiving array PI1 (which is a non-limiting example of the incremental light receiver and the first incremental light receiver recited in the claims) includes a plurality of light receiving elements that are aligned along the measurement direction C and that receive light reflected on the reflection slits of the slit track SI1 (which is a non-limiting example of the incremental pattern and the first incremental pattern recited in the claims). The light receiving array PI2 (which is a non-limiting example of the incremental light receiver and the second incremental light receiver recited in the claims) includes a plurality of light receiving elements that are aligned along the measurement direction C and that receive light reflected on the reflection slits of the slit track 512 (which is a non-limiting example of the incremental pattern and the second incremental pattern recited in the claims). The light receiving array PI1 will be described first.

In this embodiment, a set of four light receiving elements (indicated by "SET 1" in FIG. 5) is provided in one pitch of the incremental pattern of the slit track SI1 (one pitch in the projected image, which is ε×P1). Further, a plurality of such sets are aligned along the measurement direction C. In an incremental pattern, reflection slits are repeatedly aligned on a pitch basis. Therefore, the light receiving elements generate periodic signals equivalent to one period per pitch (360°, in terms of electrical angle) while the disc 110 is rotating. In this respect, four light receiving elements make up one set, which corresponds to one pitch, and adjacent light receiving elements in one set detect periodic signals that are different in phase from each other by 90°. These reception light signals will be referred to as A+ phase signal, B+ phase signal (which is different in phase from the A+ phase signal by 90°), A− phase signal (which is different in phase from the A+ phase signal by 180°), and B− phase signal (which is different in phase from the B+ phase signal by 180°).

An incremental pattern shows a position within one pitch, and therefore, the phase different signals in one set and the phase different signals in another set corresponding to the one set take values that change in a mutually similar manner. Therefore, phase identical signals are added over a plurality of sets. That is, the plurality of light receiving elements of the light receiving array PI1 illustrated in FIG. 5 detect four signals that are different in phase from each other by 90°.

The light receiving array PI2 has a configuration similar to the configuration of the light receiving array PI1. A set of four light receiving elements (which is indicated by "SET 2" in FIG. 5) is provided in one pitch of the incremental pattern of the slit track SI2 (one pitch in the projected image, which is ε×P2). Further, a plurality of such sets are aligned along the measurement direction C. With this configuration, the light receiving arrays PI1 and PI2 generate four signals that are different in phase from each other by 90°. These four signals each will be referred to as "incremental signal". Further, the incremental signal generated at the light receiving array PI2, which corresponds to the slit track SI2, which is the shorter pitch slit track, is higher in resolution than other incremental signals. In light of this, the incremental signal generated at the light receiving array PI2 will be referred to as "high incremental signal". Also, the incremental signal generated at the light receiving array PI1, which corresponds to the slit track SI1, which is the longer pitch slit track, is lower in resolution than other incremental signals. In light of this, the incremental signal generated at the light receiving array PI1 will be referred to as "low incremental signal".

As described above, in this embodiment, four light receiving elements are included in one set, which corresponds to one pitch of the incremental pattern. There is no particular limitation, however, to the number of light receiving elements in one set; for example, two light receiving elements may be included in one set.

As illustrated in FIG. 5, the optical module 120 includes a first position adjustment light receiving element 124 and a second position adjustment light receiving element 125. The first position adjustment light receiving element 124 (which is a non-limiting example of the first position adjustment light receiver recited in the claims) is provided at a position adjacent to one end of the light receiving array PA1 in the measurement direction C (the end of the light receiving array PA1 at which a first light receiving element p1 is located). Located at this position, the first position adjustment light receiving element 124 receives light emitted from the light source 121 and reflected on the slit track SA1, and outputs a first position adjustment signal. The second position adjustment light receiving element 125 (which is a non-limiting example of the second position adjustment light receiver recited in the claims) is provided at a position adjacent to one end of the light receiving array PA2 in the measurement direction C (the end of the light receiving array PA2 at which a third light receiving element p3 is located). Located at this position, the second position adjustment light receiving element 125 receives light emitted from the light source 121 and reflected on the slit track SA2, and outputs a second position adjustment signal.

The first position adjustment signal and the second position adjustment signal are output from the optical module 120 individually (that is, without being combined together), and are used for position adjustment purposes at the time when the optical module 120 is installed. Specifically, if a change occurs in the position of the optical module 120 in the circumferential direction around the optical axis, the change appears in the form of a phase difference between the first position adjustment signal and the second position adjustment signal. Based on the phase difference, the position of the optical module 120 in the circumferential direction is adjusted accurately. It is to be noted that if a change occurs in the position of the optical module 120 in the disc radial direction (the width direction R), the change appears in the form of a change in the amplitude of the first position adjustment signal and the second position adjustment signal. In light of this, it is possible to adjust the position of the optical module 120 in the radial direction based on the change in amplitude.

It is to be noted that it is preferable to make the circuit configuration and/or signal processing simple by using a common threshold value to convert the output signals from the light receiving elements into binary signals. For this purpose, it is preferable that the first position adjustment signal, which is output from the first position adjustment light receiving element 124, and the second position adjustment signal, which is output from the second position adjustment light receiving element 125, are identical in magnitude (for example, amplitude, voltage, or current) to an A phase absolute signal generated by combining a reception light signal from a single light receiving element p1 and a reception light signal from a single light receiving element p3 and/or to a B phase absolute signal generated by combining a reception light signal from a single light receiving element p2 and a reception light signal from a single light receiving element p4. In this embodiment, in order to ensure that the first position adjustment signal and the second position adjustment signal have the above-described magnitude, the light receiving areas of the first position adjustment light receiving element 124 and the second position adjustment light receiving element 125 are set at a predetermined area (for example, approximately twice the endmost light receiving element p1 of the light receiving array PA1 and the end-most light receiving element p3 of the light receiving array PA2).

It is to be noted that the first position adjustment light receiving element 124 may not necessarily be provided at the one end of the light receiving array PA1, but may be provided at the other end of the light receiving array PA1 (the end of the light receiving array PA1 at which a second light receiving element p2 is located, which is indicated by an imaginary line in FIG. 5). Alternatively, the first position adjustment light receiving element 124 may be provided at both the one end and the other end of the light receiving array PA1. Similarly, the second position adjustment light receiving element 125 may not necessarily be provided at the one end of the light receiving array PA2, but may be provided at the other end of the light receiving array PA2 (the end of the light receiving array PA2 at which the fourth light receiving element p4 is located, which is indicated by an imaginary line in FIG. 5). Alternatively, the second position adjustment light receiving element 125 may be provided at both the one end and the other end of the light receiving array PA2. There are various advantageous effects in the configuration in which the first position adjustment light receiving element 124 is provided at both the one and other ends of the light receiving array PA1 and in which the second position adjustment light receiving element 125 is provided at both the one and other ends of the light receiving array PA2. One advantageous effect is that a position adjustment can be double-checked using two systems. Another advantageous effect is that the amounts of light received at the light receiving elements located at the one and other ends of the light receiving arrays PA1 and PA2 in the measurement direction are well balanced. Thus, the above configuration improves the reliability of the first absolute signal and the second absolute signal.

2-3. Signal Processor

At the timing when the absolute position of the motor M is measured, the signal processor 130 obtains two absolute signals, a high incremental signal, and a low incremental signal from the optical module 120. Each of the two absolute signals (A phase absolute signal and B phase absolute signal) has a bit pattern indicating an absolute position. The high incremental signal and the low incremental signal include four signals that are different in phase from each other by 90°. Then, based on one absolute signal selected from the two absolute signals and the two incremental signals, the signal processor 130 calculates the absolute position of the motor M indicated by these signals. Then, the signal processor 130 generates position data indicating the absolute position, and outputs the position data to the control apparatus CT. After the absolute position has been measured (for example, after the encoder 100 is turned on and the motor M starts rotating), the signal processor 130 generates position data based on: the absolute position that has been calculated; and a relative position calculated based on the high incremental signal and the low incremental signal. Then, the signal processor 130 outputs the position data to the control apparatus CT.

It is to be noted that there is no particular limitation to the method of generating position data at the signal processor 130; it is possible to use any of various methods. In this embodiment, position data is generated based on an absolute position calculated based on a high incremental signal, a low incremental signal, and absolute signals, which will be described below.

Figure 6:
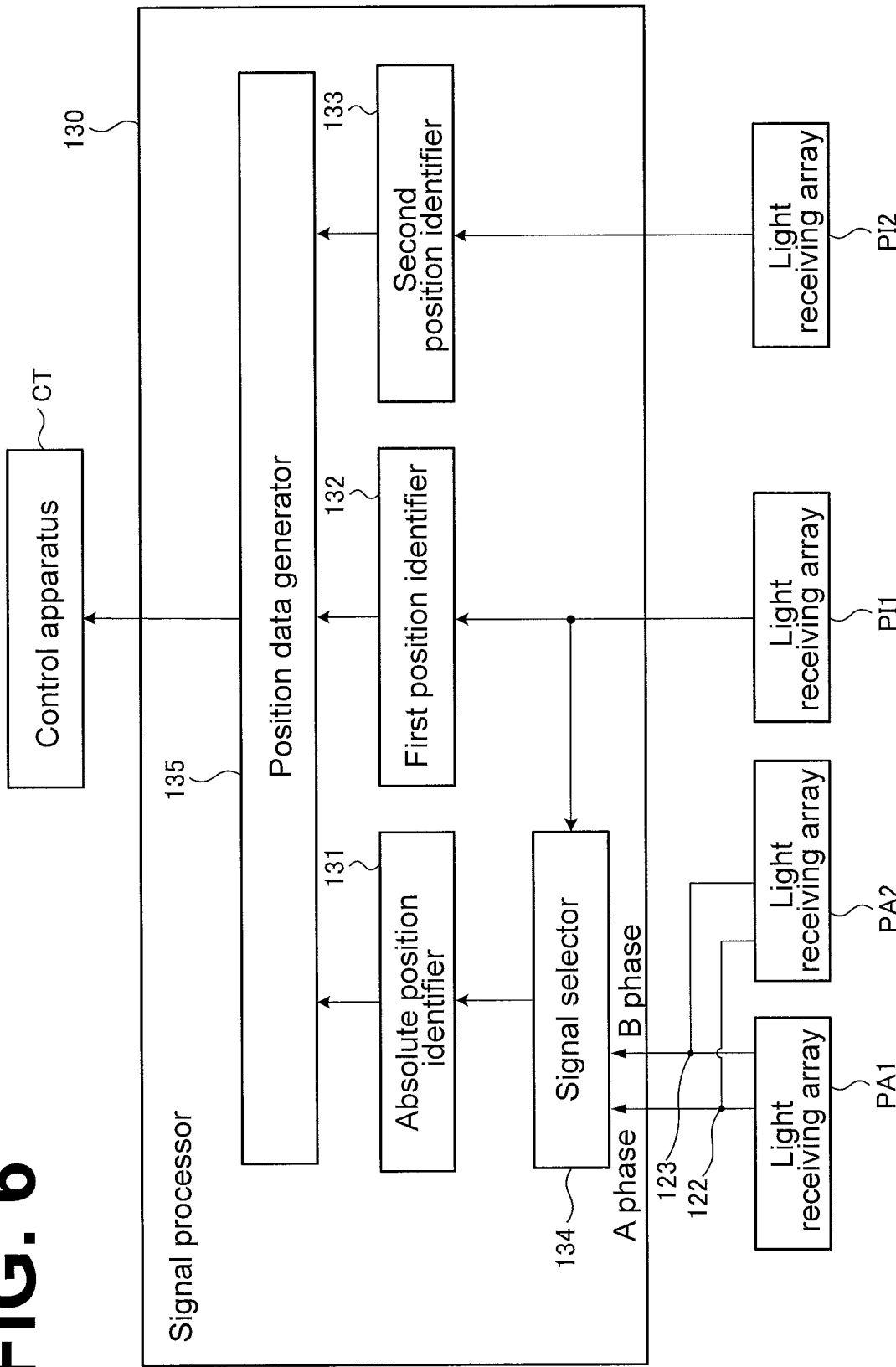
FIG. 6 is a block diagram illustrating an example functional configuration of a signal processor.

As illustrated in FIG. 6, the signal processor 130 (which is a non-limiting example of the signal processing circuit recited in the appended claims) includes an absolute position identifier 131, a first position identifier 132, a second position identifier 133, a signal selector 134 (which is a non-limiting example of the signal selection circuit recited in the appended claims), and a position data generator 135 (which is a non-limiting example of the position data generation circuit recited in the appended claims).

The absolute position identifier 131 includes a comparator (not illustrated). The comparator compares the amplitude of the A phase absolute signal or the B phase absolute signal selected by the signal selector 134 with a predetermined threshold. Then, the comparator performs a binarization such that a detection indicates the amplitude being in excess of the threshold and an un-detection indicates the amplitude being not in excess of the threshold. In this manner, the comparator generates bit data indicating the absolute position. Then, the absolute position identifier 131 identifies the absolute position based on a relationship between predetermined bit data and the absolute position.

The signal selector 134 selects the A phase absolute signal or the B phase absolute signal based on the incremental signals from the light receiving array PI1, which will be described in more detail below.

Figure 7:
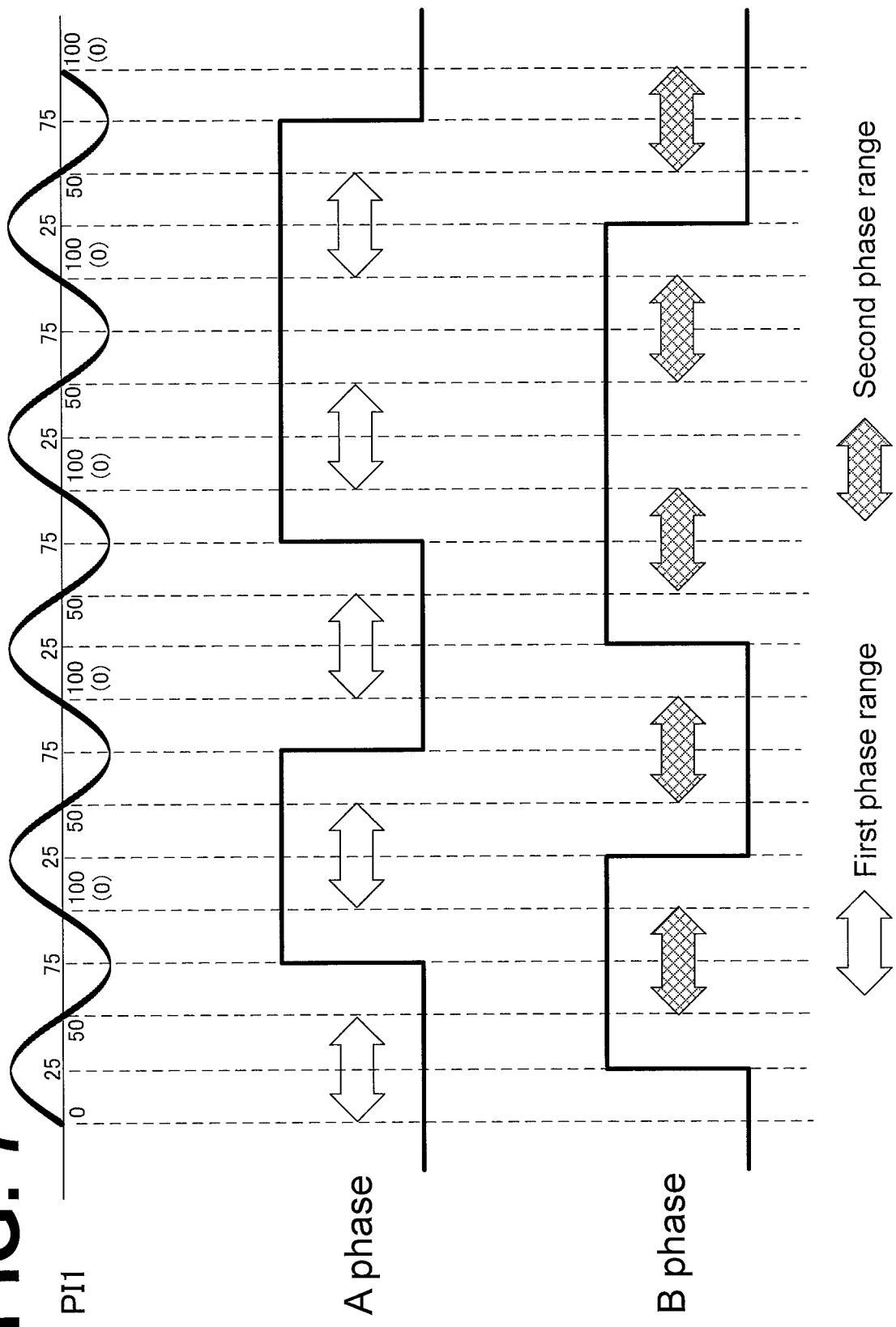
FIG. 7 illustrates example waveforms of a low incremental signal, an A phase absolute signal, and a B phase absolute signal.

First, a case where the optical module 120 has no positional deviation will be described. This case is illustrated in FIG. 7, which illustrates example waveforms of reception light signals. Referring to FIG. 7, the sine wave at the top is an example waveform of one of the four incremental signals output from the light receiving array PI1. The numbers on the axis through this waveform indicate percentage phase levels relative to one period (360° in electrical angle). The pulse waveform in the middle is an example waveform of the A phase absolute signal. The pulse waveform at the bottom is an example waveform of the B phase absolute signal.

In the example illustrated in FIG. 7, the waveform of the B phase absolute signal undergoes an on-off transition when the phase of the incremental signal from the light receiving array PI1 is 25%. In this respect, the A phase absolute signal and the B phase absolute signal are different from each other in phase by an electrical angle of 180°, as described above. The waveform of the A phase absolute signal, therefore, is phase-shifted by 50% with respect to the waveform of the B phase absolute signal (in the FIG. 7 example, the waveform of the A phase absolute signal is phase-delayed).

In this case, the 0% to 50% phase range is where the A phase absolute signal is more stable in amplitude than the B phase absolute signal. This phase range will be hereinafter referred to as first phase range (which is indicated by white double headed arrows in FIG. 7). The 50% to 100% phase range is where the B phase absolute signal is more stable in amplitude than the A phase absolute signal. This phase range will be hereinafter referred to as second phase range (which is indicated by cross-hatched double headed arrows in FIG. 7).

The signal selector 134 receives the low incremental signal from the light receiving array PI1. When the phase of the low incremental signal is within the first phase range, the signal selector 134 selects the A phase absolute signal. When the phase of the low incremental signal is within the second phase range, the signal selector 134 selects the B phase absolute signal. This ensures that the absolute position can be identified based on the absolute signal that is outside an amplitude unstable region, such as at a detection pattern changing point. As a result, the accuracy with which the absolute position is detected improves.

The first position identifier 132 receives low incremental signals having four phases from the light receiving array PI1, and performs a subtraction between the low incremental signals, among the received low incremental signals, that are different from each other in phase by 180°. By making the 180° phase-shifted signals subtract from each other, a manufacturing error, a measurement error, or some other error occurred between the reflection slits within one pitch can be canceled. As a result of the subtraction, signals are obtained, which will be hereinafter referred to as "first incremental signal" and "second incremental signal". The first incremental signal and the second incremental signal are different in phase from each other by an electrical angle of 90° (these signals may occasionally be termed more simply as "A phase signal" and "B phase signal"). Based on the first incremental signal and the second incremental signal, the first position identifier 132 identifies a position within one pitch. There is no particular limitation to the method of identifying the position within one pitch. For example, when the low incremental signal, which is a periodic signal, is a sinusoidal signal, it is possible to: divide the A phase and B phase sinusoidal signals by each other, obtaining a quotient; and subject the quotient to an arc tan operation, obtaining an electrical angle ϕ. Another possible example is to convert the two sinusoidal signals into an electrical angle ϕ using a tracking circuit. Another possible example is to identify electrical angles ϕ correlated with the values of the A phase and B phase signals on a table prepared in advance. In this case, the first position identifier 132 preferably analogue-digital converts the A phase and B phase sinusoidal signals for each of the detection signals.

The second position identifier 133 processes high incremental signals from the light receiving array PI2 in a manner similar to the manner in which the first position identifier 132 processes the low incremental signals. Then, based on two signals, the second position identifier 133 identifies a position within one pitch, with high accuracy.

The position data generator 135 superposes the position within one pitch identified by the first position identifier 132 on the absolute position identified by the absolute position identifier 131. The resulting absolute position is higher in resolution than an absolute position obtained based on absolute signals. The position data generator 135 also superposes the position within one pitch identified by the second position identifier 133 on the absolute position calculated based on the low incremental signals. The resulting absolute position is even higher in resolution than the absolute position calculated based on the low incremental signals. Then, the position data generator 135 multiplies the absolute position that has been calculated, thereby making the absolute position even higher in resolution. Then, the position data generator 135 outputs, to the control apparatus CT, the absolute position as position data indicating a highly accurate absolute position.

Next, a case where the optical module 120 has a positional deviation will be described. As used herein, the term "positional deviation" of the optical module 120 is intended to mean the situation illustrated in FIG. 8. Specifically, the optical module 120 is (the optical module 120 illustrated in FIG. 8) in position from its proper position (indicated by a solid line and reference numeral 120) in the circumferential direction of the disc 110 around the disc center O relative to the disc 110 (a positional deviation of angle θ1 is indicated by a broken line and reference numeral 120A); or the optical module 120 is deviated in position from its proper position in the circumferential direction around the optical axis of the light source 121 (or around an axis parallel to the optical axis) relative to the disc 110 (a positional deviation of angle θ2 is indicated an imaginary line and reference numeral 120B).

Figure 9:
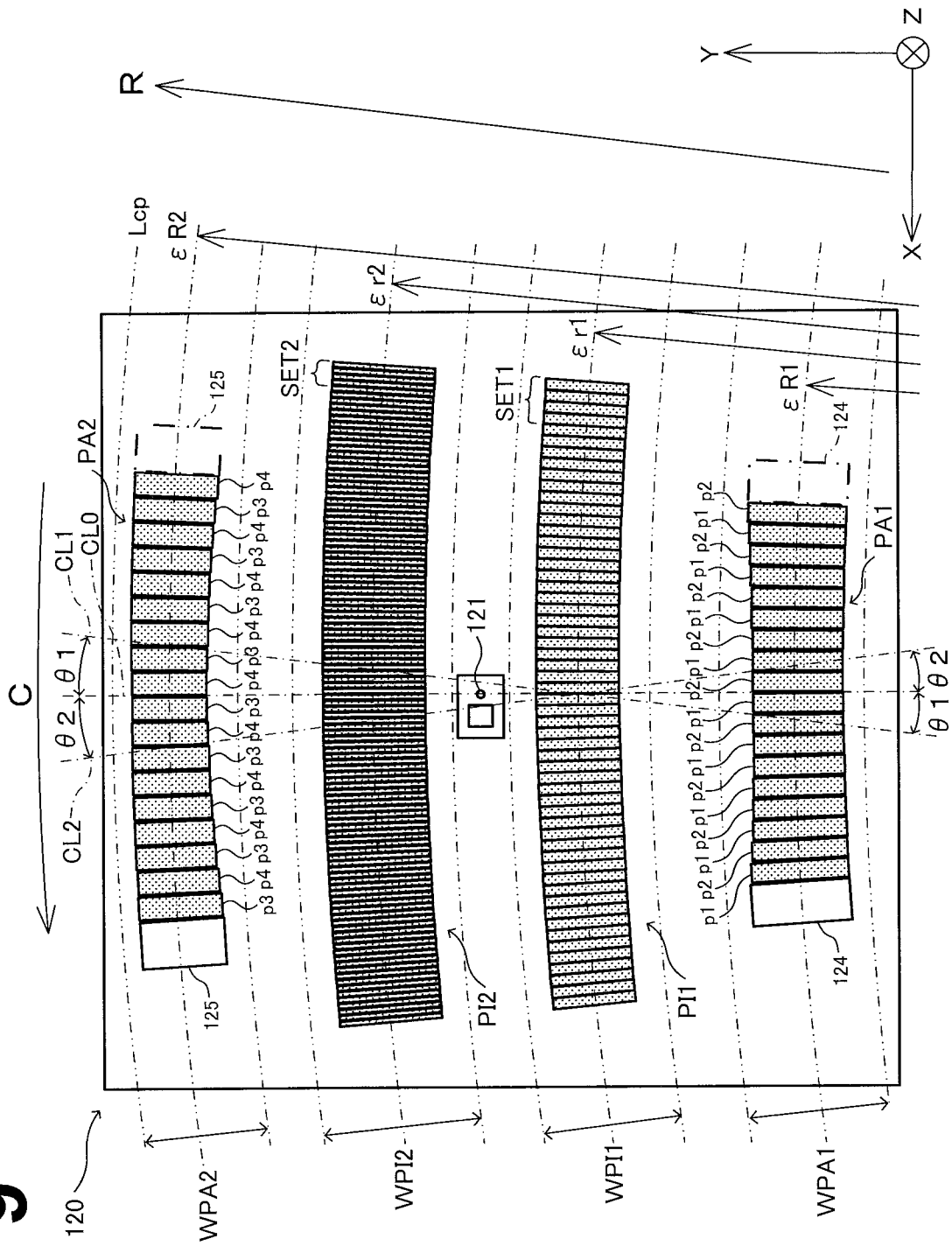
FIG. 9 illustrates a phase difference that occurs between the low incremental signal and the A phase absolute signal and between the low incremental signal and the B phase absolute signal when there is a positional deviation in the optical module.

When the optical module 120 has such positional deviation, there is a difference between: the position of the light receiving array PI1 in the width direction R, which serves as a basis for the selection between the A phase absolute signal and the B phase absolute signal; and the position of each of the light receiving arrays PA1 and PA2 in the width direction R. This difference causes a phase discrepancy to occur between the low incremental signal and the A phase absolute signal and between the low incremental signal and the B phase absolute signal. Specifically, as illustrated in FIG. 9, a possible positional deviation is that the center line of the optical module 120 (the line passing the light source 121 and the measurement direction center position of each light receiving array) is deviated in position to a first discrepancy position CL1 from the proper position, CL0, of the optical module 120 (this positional deviation corresponds to that of the optical module 120A illustrated in FIG. 8). In this positional deviation, the second absolute signal from the light receiving array PA2 is ahead of the low incremental signal from the light receiving array PI1 in phase, and the first absolute signal from the light receiving array PA1 is behind the low incremental signal from the light receiving array PI1 in phase. In this respect, the distance between the light receiving array PA2 and the light receiving array PI1 (εR2−ε1) is larger than the distance between the light receiving array PI1 and the light receiving array PA1 (εr1−εR1). Therefore, the phase difference between the second absolute signal and the low incremental signal is larger than the phase difference between the first absolute signal and the low incremental signal. Another possible positional deviation is that the center line of the optical module 120 is deviated in position to a second discrepancy position CL2 from the proper position CL0 (this positional deviation corresponds to that of the optical module 120B illustrated in FIG. 8). This positional deviation is opposite to the above-described positional deviation in that the second absolute signal from the light receiving array PA2 is behind the low incremental signal from the light receiving array PI1 in phase, and the first absolute signal from the light receiving array PA1 is ahead of the low incremental signal from the light receiving array PI1 in phase. In this case as well, the phase difference between the second absolute signal and the low incremental signal is larger than the phase difference between the first absolute signal and the low incremental signal.

Figure 10:
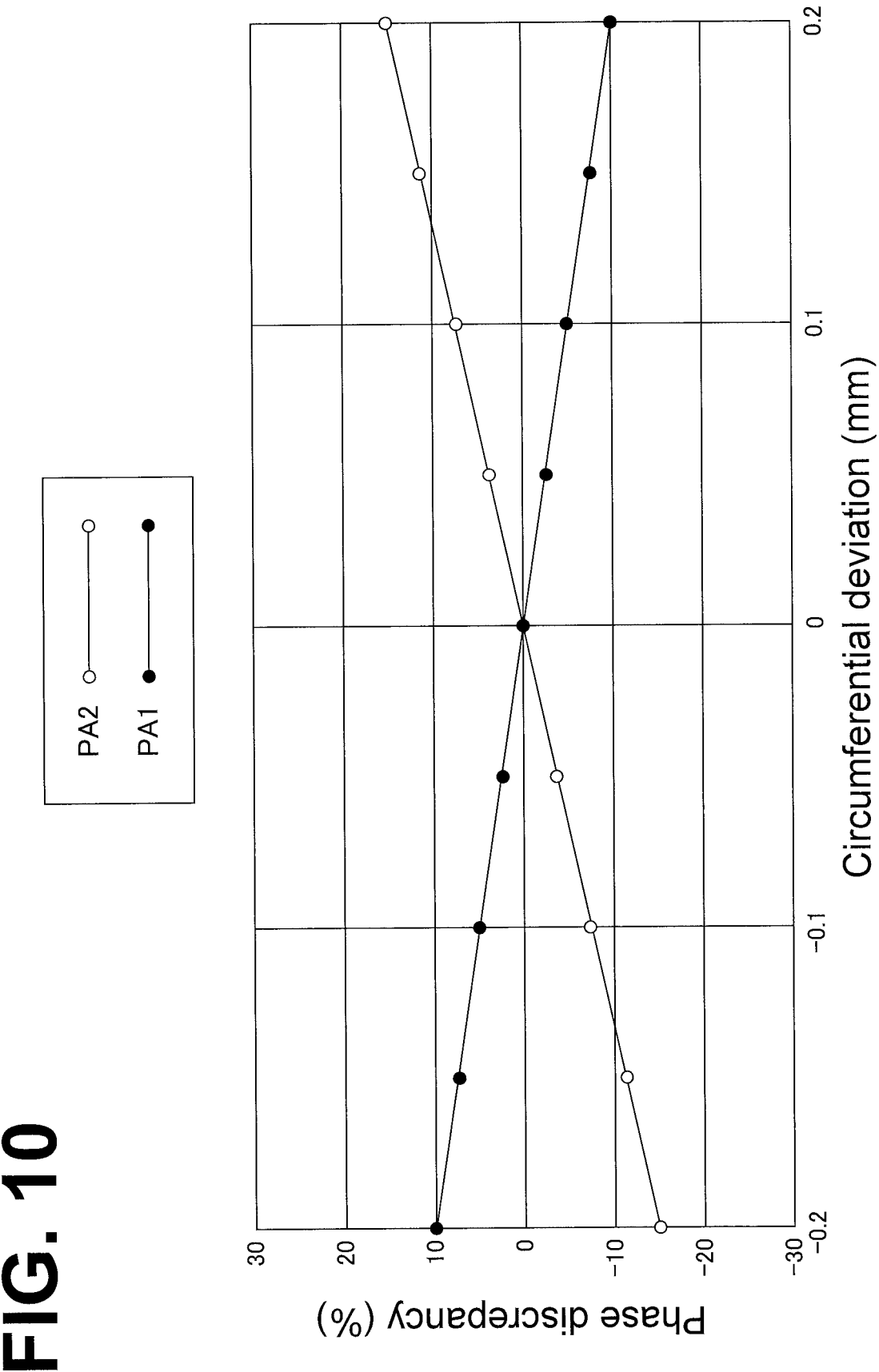
FIG. 10 is a graph showing an example relationship between: phase discrepancy that a first absolute signal and a second absolute signal have relative to the low incremental signal; and circumferential deviation of the optical module.

FIG. 10 is a graph showing an example relationship between: phase discrepancy (%) that the first absolute signal, which is output from the light receiving array PA1, and the second absolute signal, which is output from the light receiving array PA2, have relative to the low incremental signal, which is output from the light receiving array PI1; and circumferential deviation (mm) of the optical module 120. The circumferential deviation illustrated in FIG. 10 is such a deviation that the optical module 120 is deviated in position relative to the disc 110 in the circumferential direction of the disc 110 around the disc center O from the proper position of the optical module 120 (the optical module 120 illustrated in FIG. 8). This positional deviation corresponds to that of the optical module 120A illustrated in FIG. 8. Also in FIG. 10, the phase discrepancy is in percentage values relative to one period (360° in electrical angle) of the low incremental signal, which is output from the light receiving array PI1. As illustrated in FIG. 10, as the circumferential deviation increases from 0 (toward the positive side), the second absolute signal from the light receiving array PA2 gradually proceeds ahead of the low incremental signal from the light receiving array PI1 in phase (the phase discrepancy increases toward the positive side), and the first absolute signal from the light receiving array PA1 gradually delays behind the low incremental signal in phase (the phase discrepancy increases toward the negative side). Also, as the circumferential deviation decreases from 0 (toward the negative side), the second absolute signal from the light receiving array PA2 gradually delays behind the low incremental signal in phase (the phase discrepancy increases toward the negative side), and the first absolute signal from the light receiving array PA1 gradually proceeds ahead of the low incremental signal in phase (the phase discrepancy increases toward the positive side). In this respect, the phase discrepancy of the second absolute signal is larger in magnitude than the phase discrepancy of the first absolute signal, as described above.

Thus, the phase discrepancy between the low incremental signal and the first absolute signal and the phase discrepancy between the low incremental signal and the second absolute signal increase, it is possible for the signal selector 134 to be unable to perform its signal selection as properly as it does as illustrated in FIG. 7. Specifically, as illustrated in FIG. 7, when the phase of the low incremental signal is within the first phase range, the signal selector 134 selects the A phase absolute signal. If, however, the phase discrepancy increases, the resulting pattern may show detection (High) and un-detection (Low) the other way around, or the resulting pattern may be in an unstable region such as at a detection pattern changing point. Similarly, when the phase of the low incremental signal is within the second phase range, the signal selector 134 selects the B phase absolute signal. If, however, the phase discrepancy increases, the resulting pattern may show detection (High) and un-detection (Low) the other way around, or the resulting pattern may be in an unstable region such as at a detection pattern changing point. This may cause a false absolute position detection to occur.

Figure 11:
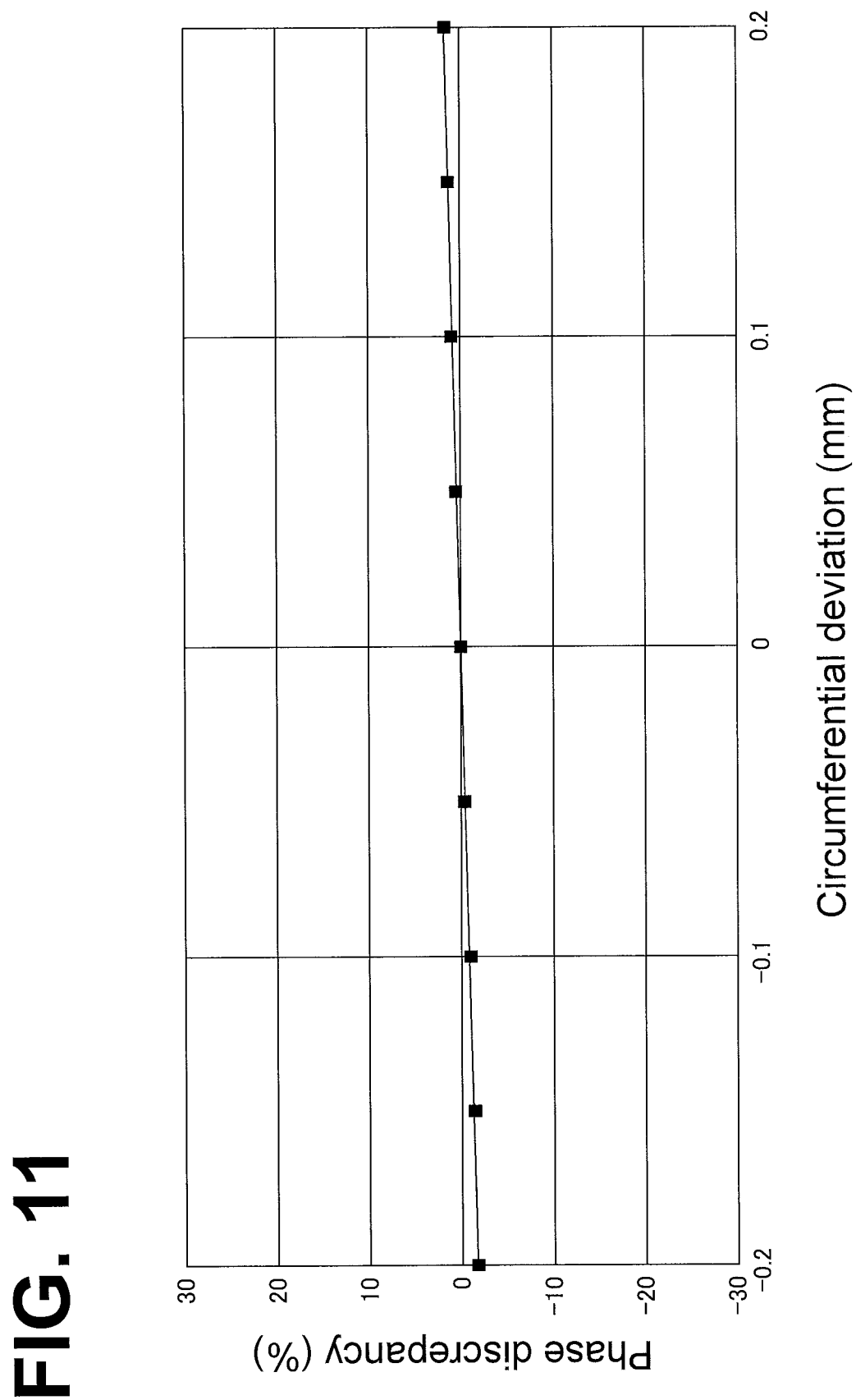
FIG. 11 is a graph showing an example relationship between: a phase discrepancy that the A phase absolute signal and the B phase absolute signal have relative to the low incremental signal; and the circumferential deviation of the optical module.

With the circumstances taken into consideration, in this embodiment, the first absolute signal having the first phase and the second absolute signal having the first phase are combined into the A phase absolute signal, and the first absolute signal having the second phase and the second absolute signal having the second phase are combined into the B phase absolute signal, as described above. FIG. 11 illustrates an example relationship between: phase discrepancy (%) that the A phase absolute signal and the B phase absolute signal have relative to the low incremental signal; and circumferential deviation (mm) of the optical module 120. As illustrated in FIG. 11, by combining the first absolute signal and the second absolute signal, the phase discrepancy is canceled, advantageously reducing the phase discrepancy. It is to be noted that in this embodiment, the phase discrepancy is not canceled completely; there is a slight amount of phase discrepancy left as there is a circumferential deviation of the optical module 120. This is because the distance between the light receiving array PA2 and the light receiving array PI1 is larger than the distance between the light receiving array PI1 and the light receiving array PA1.

It is to be noted that the above-described example in which the processings performed by the signal processor 130 are assigned to its processing elements (such as the absolute position identifier 131, the first position identifier 132, the second position identifier 133, the signal selector 134, and the position data generator 135) is not intended in a limiting sense. Another possible example is that the processings are assigned to a smaller number of processing elements of the signal processor 130 (for example, one processing element). Still another possible example is that the processings are assigned to a larger number of more meticulously segmented processing elements of the signal processor 130. It is also to be noted that the functions of the signal processor 130 may be implemented by a program executed by CPU 901 (described later by referring to FIG. 16), or may be partially or entirely implemented by a tangible device or devices such as an application specific integrated circuit (ASIC), a field-programmable gate array (FPGA), and other electric circuits.

3. Example Advantageous Effects of this Embodiment

In the above-described embodiment, the encoder 100 includes the disc 110 and the optical module 120. The disc 110 includes: the slit track SA1, which is formed along the measurement direction C and has the first absolute pattern; and the slit track SA2, which is formed along the measurement direction C and has the second absolute pattern. The optical module 120 measures the disc 110 along the measurement direction C. The optical module 120 includes the light receiving array PA1 and the light receiving array PA2. The light receiving array PA1 receives light emitted from the light source 121 and reflected on the slit track SA1, and includes the plurality of first light receiving elements p1 and the plurality of second light receiving elements p2. Each of the plurality of first light receiving elements p1 outputs the first absolute signal having the first phase. Each of the plurality of second light receiving elements p2 is aligned alternately with one of the plurality of first light receiving elements p1 along the measurement direction C, and outputs the first absolute signal having the second phase, which is different from the first phase by a predetermined phase. The light receiving array PA2 is opposed to the light receiving array PA1 across the optical axis Op of the light source 121, and receives light emitted from the light source 121 and reflected on the slit track SA2. The light receiving array PA2 includes the plurality of third light receiving elements p3 and the plurality of fourth light receiving elements p4. Each of the plurality of third light receiving elements p3 outputs the second absolute signal having the first phase. Each of the plurality of fourth light receiving elements p4 is aligned alternately with one of the plurality of third light receiving elements p3 along the measurement direction C, and outputs the second absolute signal having the second phase.

In the encoder 100 according to this embodiment, each of the light receiving array PA1 and the light receiving array PA2 outputs two absolute signals that are different from each other by a predetermined phase. With this configuration, if one of the absolute patterns is in an unstable region such as at an absolute pattern changing point, it is possible to use an absolute signal obtained from a light receiving element positioned outside the unstable region so as to identify an absolute position. This configuration improves the accuracy with which the absolute position is detected. Also in the encoder 100, the light receiving array PA1 and the light receiving array PA2 are opposed to each other across the optical axis Op of the light source 121 (that is, the optical axis Op of the light source 121 is provided between the light receiving arrays PA1 and PA2). The two absolute signals output from such light receiving arrays are used as a basis for the generation of position data indicating an absolute position. This minimizes the influence that the positional deviation of the optical module 120 in the circumferential direction around the optical axis has on the accuracy with which the absolute position is detected. As a result, the setting of the initial position of the sensor at the time of encoder production is simplified.

Also in this embodiment, the optical module 120 further includes the first signal combiner 122 and the second signal combiner 123. The first signal combiner 122 combines the first absolute signal having the first phase with the second absolute signal having the first phase to generate the first phase signal. The second signal combiner 123 combines the first absolute signal having the second phase with the second absolute signal having the second phase to generate the second phase signal.

This configuration ensures that even though a phase discrepancy between the first absolute signal and the second absolute signal is caused to by the positional deviation of the optical module 120 in the circumferential direction around the optical axis, the phase discrepancy is canceled. Thus, the influence that a positional deviation has on the accuracy with which the absolute position is detected is minimized.

Also in this embodiment, the disc 110 includes the slit tracks SI1 and SI2, which have incremental patterns and are formed along the measurement direction C. The optical module 120 includes the light receiving arrays PI1 and PI2, which are provided between the light receiving array PA1 and the light receiving array PA2. The light receiving array PI1 receives light emitted from the light source 121 and reflected on the slit track SI1, and outputs incremental signals. The light receiving array PI2 receives light emitted from the light source 121 and reflected on the slit track SI2, and outputs incremental signals.

This configuration ensures that position data indicating an absolute position is generated based on an absolute signal and an incremental signal, resulting in an increased level of resolution of the encoder 100. Also, the above-described configuration in which the first absolute signal and the second absolute signal are combined together can lead to the assumption that there is an imaginary absolute light receiver between the light receiving array PA1 and the light receiving array PA2. By providing the light receiving arrays PI1 and PI2 between the light receiving array PA1 and the light receiving array PA2, the light receiving arrays PI1 and PI2 are made closer in position to the imaginary absolute light receiver. This makes smaller the phase difference between the combination of the incremental signal and the absolute signal, minimizing the influence that a positional deviation has on the accuracy with which the absolute position is detected. Also by providing the light receiving arrays PI1 and PI2 between the light receiving array PA1 and the light receiving array PA2, the light receiving arrays PI1 and PI2 are made closer in position to the light source 121, ensuring that a comparatively large amount of light is received. As a result, the accuracy with which the absolute position is detected improves.

Also in this embodiment, the slit tracks SI1 and SI2 include: the slit track SI1; and the slit track SI2, which is shorter in pitch than the slit track SI1. The light receiving arrays PI1 and PI2 include: the light receiving array PI1, which receives light emitted from the light source 121 and reflected on the slit track SI1, and outputs low incremental signals; and the light receiving array PI2, which is opposed to the light receiving array PI1 across the light source 121, receives light emitted from the light source 121 and reflected on the slit track SI2, and outputs high incremental signals.

By using a low incremental signal and a high incremental signal, resolution multiplication is accomplished, ensuring that the resulting position data indicates an absolute position with a higher level of resolution. Thus, the resolution of the encoder 100 further increases. Also, the configuration in which the light receiving array PI1 and the light receiving array PI2 are opposed to each other across the light source 121 enables the light receiving array PI2 to be closer in position (on which the resolution depends) to the light source 121. This ensures that a comparatively large amount of light is received, resulting in improved detection accuracy.

Also in this embodiment, the encoder 100 further includes the signal processor 130. The signal processor 130 includes the signal selector 134 and the position data generator 135. The signal selector 134 selects the first phase signal or the second phase signal based on the low incremental signal. The position data generator 135 generates, based on the first phase signal or the second phase signal selected by the signal selector 134, position data indicating an absolute position.

With this configuration, if one of the absolute patterns is in an unstable region such as at an absolute pattern changing point, it is possible to use an absolute signal obtained from a light receiving element positioned outside the unstable region so as to identify an absolute position. This configuration improves the accuracy with which the absolute position is detected. The above configuration also ensures that the above-described imaginary absolute light receiver is closer in position to the light receiving array PI1, which serves as a basis for signal selection. This closeness further reduces the influence of a positional deviation, if any, of the optical module 120 in the circumferential direction around the optical axis.

Also in this embodiment, the light receiving array PA1 outputs the first absolute signal, which is substantially same in size to the second absolute signal, which is output from the light receiving array PA2.

This configuration ensures that the phase discrepancy between the first absolute signal and the second absolute signal is canceled more accurately, further reducing the influence of a positional deviation, if any, of the optical module 120 in the circumferential direction around the optical axis.

Also in this embodiment, the light receiving array PA1 has a first light receiving area in which a first amount of light is received, and the light receiving array PA2 has a second light receiving area in which a second amount of light is received. The first amount of light and the second amount of light are approximately equal to each other. Thus, by adjusting the light receiving areas of the light receiving array PA1 and the light receiving array PA2, the light receiving array PA1 is able to receive an amount of light substantially same to the amount of light received at the light receiving array PA2.

This configuration makes the first absolute signal and the second absolute signal optically identical signals, and eliminates the need for adjusting signal size by, for example, adjusting gain on the circuit side. Thus, it is necessary to increase circuit size. As a result, the accuracy with which the absolute position is detected increases efficiently.

Also in this embodiment, the optical module 120 includes the first position adjustment light receiving element 124 and the second position adjustment light receiving element 125. The first position adjustment light receiving element 124 is adjacent to the light receiving array PA1 in the measurement direction C, receives light emitted from the light source 121 and reflected on the slit track SA1, and outputs a first position adjustment signal. The second position adjustment light receiving element 125 is adjacent to the light receiving array PA2 in the measurement direction C, receives light emitted from the light source 121 and reflected on the slit track SA2, and outputs a second position adjustment signal.

In this embodiment, the first absolute signal and the second absolute signal are combined together in order to minimize the influence of a positional deviation, if any, of the optical module 120 in the circumferential direction around the optical axis. For this reason, the first absolute signal and the second absolute signal cannot be used to adjust the optical module 120 to its proper position in the circumferential direction. In light of the considerations above, the first position adjustment light receiving element 124 and the second position adjustment light receiving element 125 are provided to adjust the position of the optical module 120 based on the first position adjustment signal and the second position adjustment signal. Specifically, if a change occurs in the position of the optical module 120 in the circumferential direction around the optical axis, the change appears in the form of a phase difference between the first position adjustment signal and the second position adjustment signal. Based on the phase difference, the position of the optical module 120 in the circumferential direction is adjusted accurately.

Also in this embodiment, the disc 110 is a rotatable disc on which the slit track SA1 and the slit track SA2 are formed in circle in the circumferential direction of the disc 110 around the disc center O. The optical module 120 measures the slit track SA1 and the slit track SA2 along the circumferential direction of the disc 110.

This configuration increases robustness against change of relative positions of the optical module 120 and the disc 110 in the circumferential direction around the disc center O, ensuring that a larger margin of eccentricity is secured between the axis AX of the shaft SH and the disc center O.

4. Modifications

Modifications of the above-described embodiment will be described below.

4-1. Reference Incremental Signal Generated for Signal Selection

The light receiving array PI1 outputs a low incremental signal, which serves as a basis for the selection between the A phase absolute signal and the B phase absolute signal. In the above-described embodiment, the position of the light receiving array PI1 is displaced from the middle position between the light receiving arrays PA1 and PA2 (the position of the light source 121). Because of this displacement, there is a slight amount of phase discrepancy left unhandled. In light of the considerations above, it is possible to: provide an imaginary light receiving array positioned in the middle of the light receiving arrays PA1 and PA2; generate a reference signal from the imaginary light receiving array; and select the A phase absolute signal or the B phase absolute signal based on the reference signal.

Figure 12:
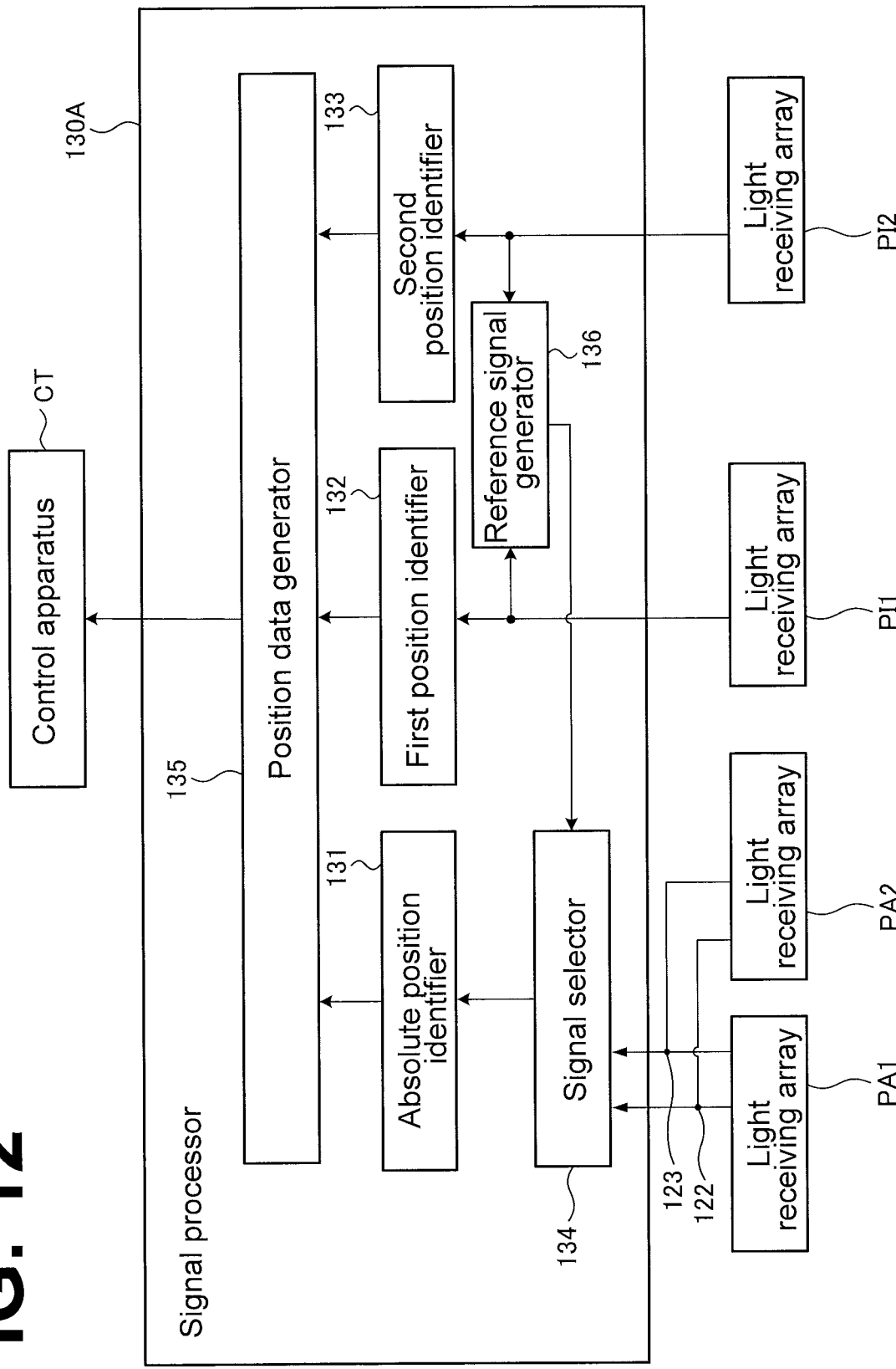
FIG. 12 is a block diagram illustrating an example functional configuration of a signal processor according to a modification in which a reference incremental signal is generated for signal selection purposes.

FIG. 12 illustrates an example functional configuration of the signal processor, 130A, according to this modification. As illustrated in FIG. 12, the signal processor 130A includes a reference signal generator 136, in addition to the configuration of the signal processor 130.

The reference signal generator 136 generates a reference incremental signal based on: a low incremental signal, which is output from the light receiving array PI1; and a high incremental signal, which is output from the light receiving array PI2. Specifically, the reference signal generator 136 detects a phase difference between the low incremental signal and the high incremental signal, and shifts (proceeds or delays) the phase of the low incremental signal by half the phase difference detected. Thus, the reference incremental signal output from the imaginary light receiving array positioned in the middle of the light receiving arrays PA1 and PA2 in the width direction R is generated. Then, the signal selector 134 selects the A phase absolute signal or the B phase absolute signal based on the reference incremental signal that has been generated.

Figure 13:
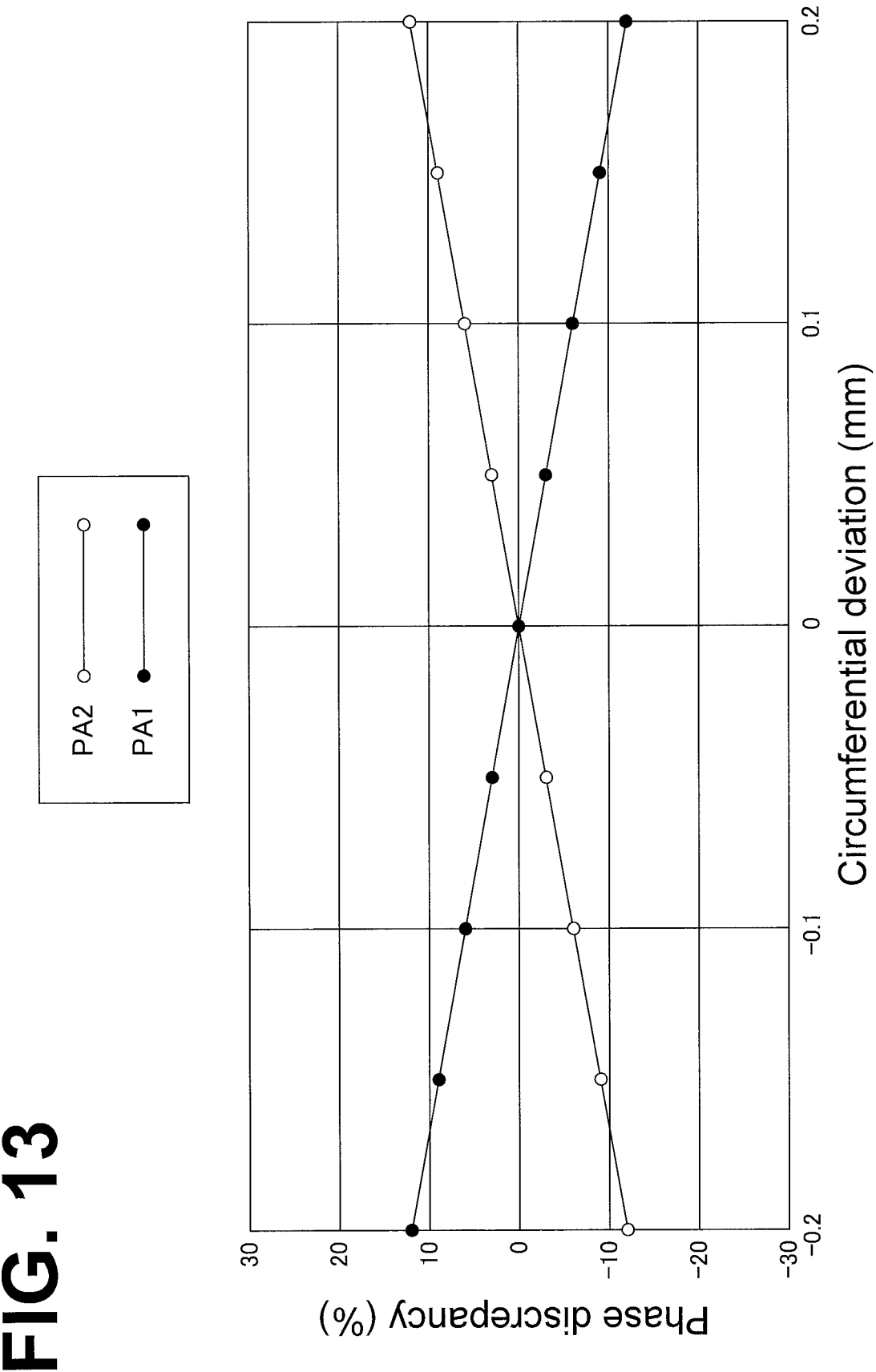
FIG. 13 is a graph showing, in the modification in which the reference incremental signal is generated for signal selection purposes, an example relationship between: a phase discrepancy that the first absolute signal and the second absolute signal have relative to the low incremental signal; and the circumferential deviation of the optical module.

FIG. 13 illustrates an example relationship between: phase discrepancy (%) that the first absolute signal and the second absolute signal according to this modification have relative to the reference incremental signal; and circumferential deviation (mm) of the optical module 120. As illustrated in FIG. 13, the phase discrepancy of the first absolute signal and the phase discrepancy of the second absolute signal are approximately the same in magnitude.

Figure 14:
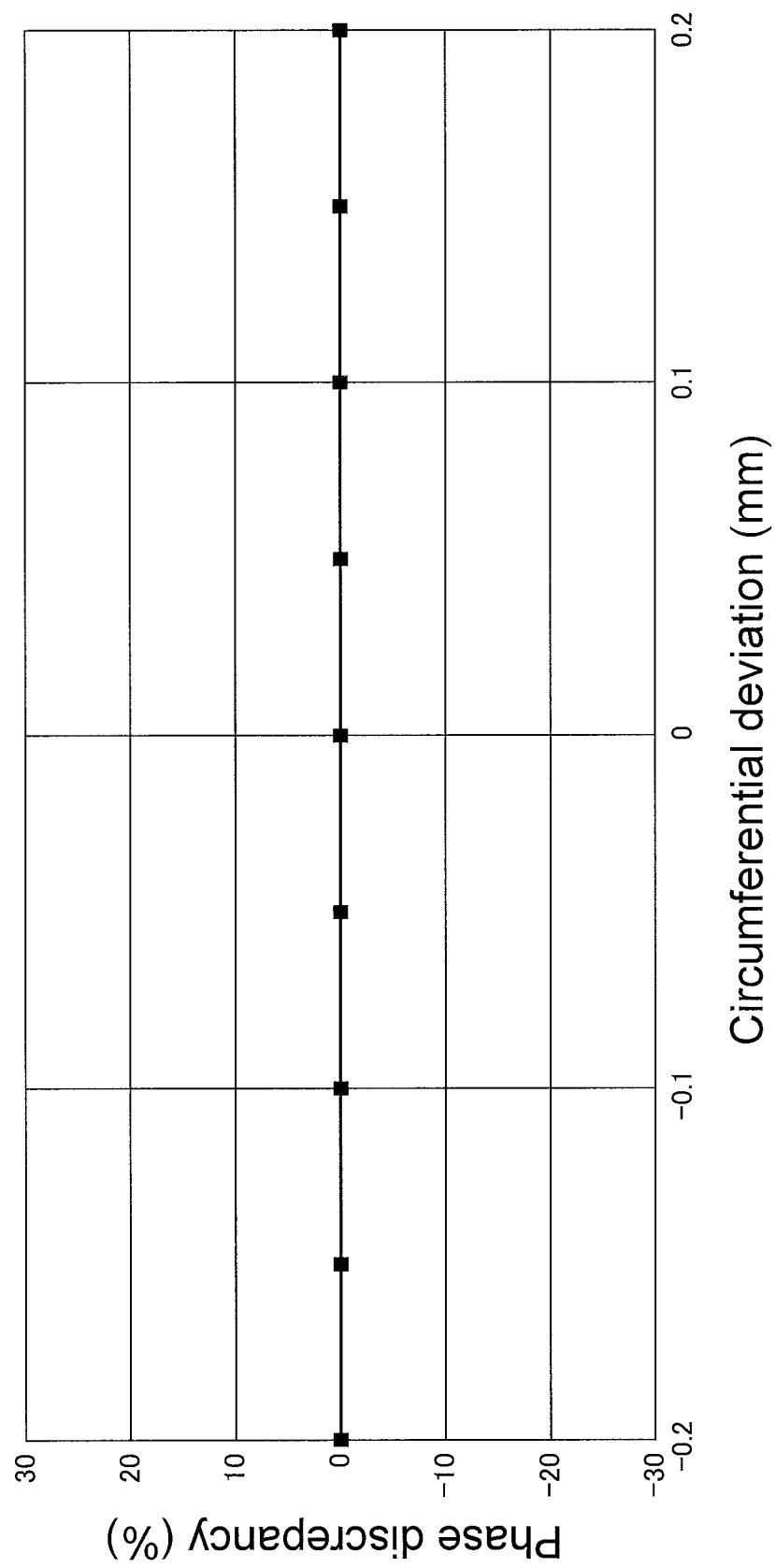
FIG. 14 is a graph showing, in the modification in which the reference incremental signal is generated for signal selection purposes, an example relationship between: a phase discrepancy that the A phase absolute signal and the B phase absolute signal have relative to the low incremental signal; and the circumferential deviation of the optical module.

FIG. 14 illustrates an example relationship between: phase discrepancy (%) that the A phase absolute signal and the B phase absolute signal according to this modification have relative to the reference incremental signal; and circumferential deviation (mm) of the optical module 120. As illustrated in FIG. 14, the phase discrepancy is canceled, which is accomplished by combining the first absolute signal and the second absolute signal together. Thus, the phase discrepancy is eliminated or minimized.

In this modification, the reference incremental signal is generated by adding half the phase difference between the low incremental signal and the high incremental signal to the phase of the low incremental signal. This leads to the assumption that an imaginary reference incremental light receiver that outputs the reference incremental signal is provided at the middle position between the light receiving arrays PA1 and PA2 (the position of the light source 121). This ensures that the position of the imaginary absolute light receiver that outputs the A phase absolute signal and the B phase absolute signal approximately matches the position of the reference incremental light receiver, which serves as a basis of signal selection. Because of this match in position, the influence of a positional deviation, if any, of the optical module 120 in the circumferential direction around the optical axis is eliminated or minimized.

4-2. Changing of Layout of Light Receiving Array

In the above-described modification, certain signal processing is performed to make the position of the imaginary absolute light receiver approximately match the position of the incremental light receiver that serves as a basis of signal selection. This configuration, however, is not intended in a limiting sense. For example, it is possible to change the layout of the light receiving arrays of the optical module 120 so as to make the position of the imaginary absolute light receiver approximately match the position of the incremental light receiver that serves as a basis of signal selection.

Figure 15:
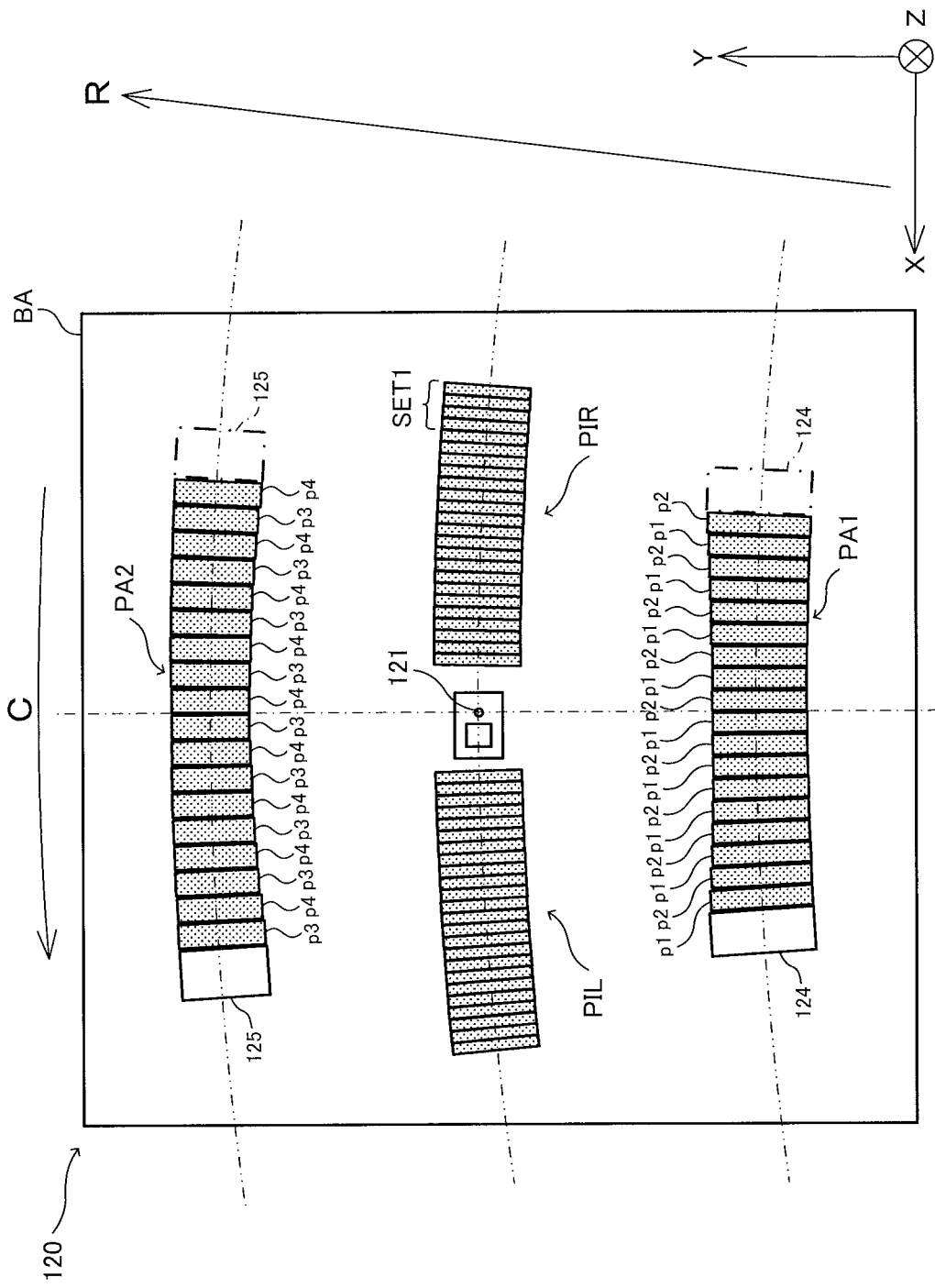
FIG. 15 is a bottom side view of the disc illustrating an example layout of the light source of the optical module and the light receiving arrays according to a modification in which the light receiving array layout in an incremental signal is changed.

FIG. 15 illustrates an example layout of the light receiving arrays of the optical module, 120A, according to this modification. As illustrated in FIG. 15, the optical module 120A includes: light receiving arrays PA1 and PA2; and light receiving arrays PIL (an example of "a third absolute light receiver") and PIR (an example of "a fourth absolute light receiver"). Each of the light receiving arrays PIL and PIR has a middle portion that is approximately level with the light source 121 in the width direction R, and are opposed to each other across the light source 121 in the measurement direction C. Each of the light receiving arrays PIL and PIR includes a plurality of sets of four light receiving elements (indicated by "SET 1" in FIG. 15) aligned along the measurement direction C. Each of the light receiving elements receives light reflected on a reflection slit of the slit track SU (an example of "a third absolute pattern"), which has an incremental pattern. With this configuration, each of the light receiving arrays PIL and PIR outputs four low incremental signals that are different in phase from each other by 90°. The disc 110 according to this modification includes three slit tracks SA1, SI1, and SA2 (not illustrated). The slit tracks SA1, SI1, and SA2 are aligned in this order from the center to the edge of the disc 110 in the width direction R. Except for the light receiving arrays PA1 and PA2, the optical module 120A is similar in configuration to the optical module 120 according to the above-described embodiment, and will not be elaborated upon further here.

It is to be noted that in this modification, the signal selector 134 selects the A phase absolute signal or the B phase absolute signal based on the low incremental signals from the light receiving arrays PIL and FIR. The absolute position identifier 131 identifies an absolute position based on the absolute signal that has been selected. The position data generator 135 superposes a position within one pitch identified by the first position identifier 132 on the absolute position identified by the absolute position identifier 131, thereby generating position data indicating the absolute position.

In this modification, the light receiving arrays PIL and PIR are provided at the middle position between the light receiving arrays PA1 and PA2 (the position of the light source 121). This ensures that the position of the imaginary absolute light receiver that outputs the A phase absolute signal and the B phase absolute signal approximately matches the position of the light receiving arrays PIL and PIR, which serve as a basis of signal selection. Because of this match in position, the influence of a positional deviation, if any, of the optical module 120A in the circumferential direction around the optical axis is eliminated or minimized.

It is to be noted that in this modification, the light receiving arrays PIL and PIR each may be a light receiving array that receives light reflected on a reflection slit of the slit track SI2 and outputs a high incremental signal. In this case, the three slit tracks on the disc 110 are aligned in the order of SA1, SI2, and SA2 from the center to the edge of the disc 110 in the width direction R.

4-3. Other Modifications

In the above-described embodiment and modifications, two slit tracks SI1 and SI2 are provided on the disc 110 such that the slit tracks SI1 and 512 have incremental patterns of different pitches. Another possible example is that equal to or more than three slit tracks having incremental patterns of different pitches are provided on the disc 110. In this case as well, a high level of resolution is accomplished by resolution multiplication.

In the above-described embodiment and modifications, each of the light receiving arrays PA1 and PA2 includes 18 light receiving elements, and each of the A phase absolute signal and the B phase absolute signal indicates a 9-bit absolute position. The number of light receiving elements, however, will not be limited to 18, and each absolute signal may have other than 9 bits. Also, the light receiving elements of each of the light receiving arrays PI1 and PI2 will not be limited to the number specified in the above-described embodiment.

In the above-described embodiment and modifications, the encoder 100 is directly connected to the motor M. Another possible example is that the encoder 100 may be connected to the motor M via a mechanism such as a reducer and a rotation direction changing mechanism.

In the above-described embodiment, the encoder 100 is a "reflective encoder", in which the light source and the light receiving arrays are formed on the same surface facing the slit tracks of the disc 110. This configuration, however, is not intended in a limiting sense; the encoder 100 may be a "transmissive encoder", in which the light source is opposed to the light receiving arrays across the disc 110. In the transmissive encoder case, the slit tracks SA1, SA2, SI1, and SI2 may be formed as transmissive slits on the disc 110. Another possible example is that portions of the disc 110 other than the slits may be roughened by processing such as sputtering, or low transmission material may be applied to portions of the disc 110 other than the slits. In the optical module 120 according to this modification (in which a transmissive encoder is used), the light source 121 faces the light receiving arrays PA1, PA2, PI1, and PI2 across the disc 110. Thus, the optical module 120 according to this modification encompasses configurations in which the light source is separate from the light receiving arrays. In this transmissive encoder case as well, advantageous effects similar to the advantageous effects provided in the above-described embodiment are provided.

5. Example Hardware Configuration of Control Section

By referring to FIG. 16, an example hardware configuration of the signal processor 130 will be described (the signal processor 130A has a similar hardware configuration).

Figure 16:
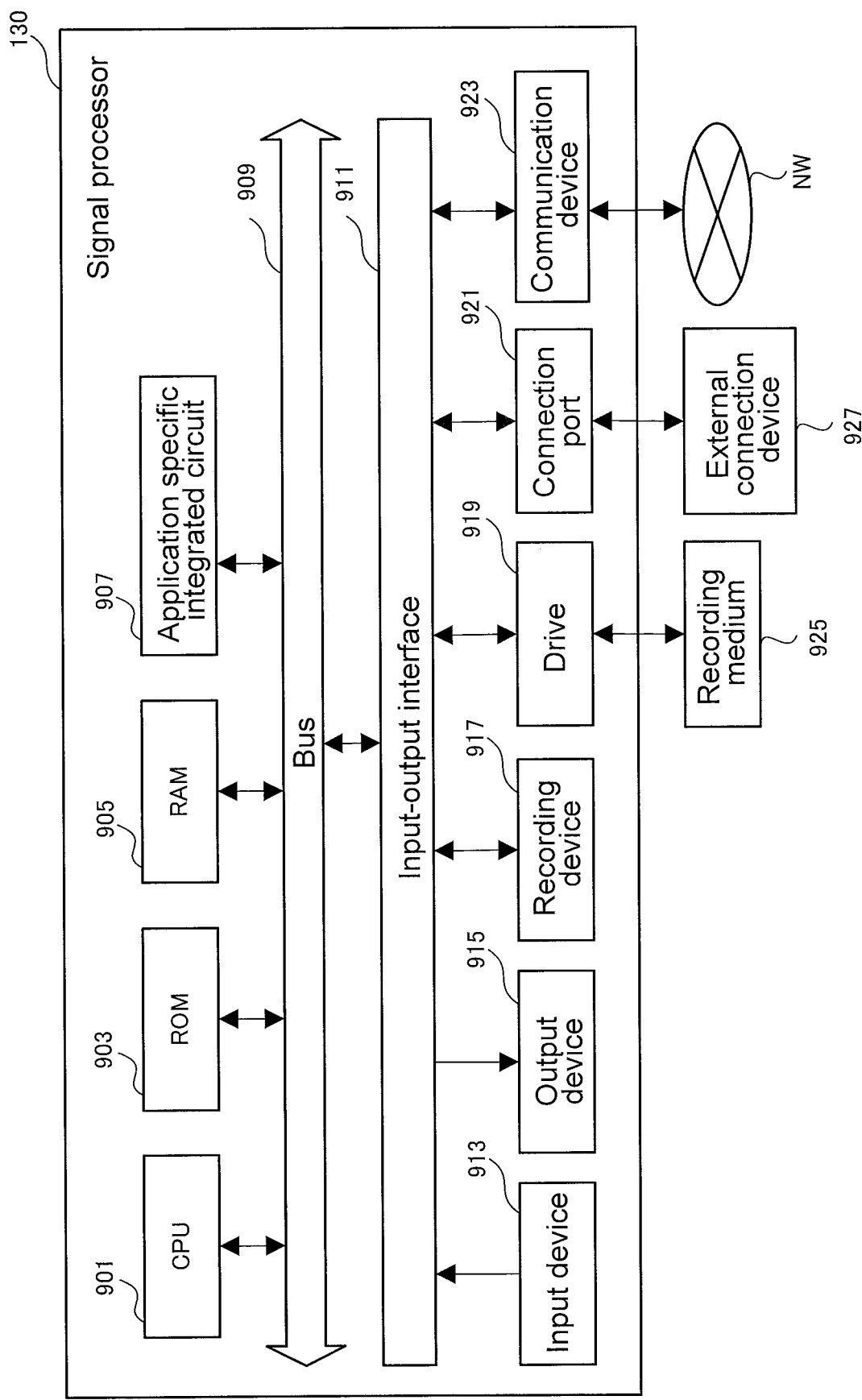
FIG. 16 is a block diagram illustrating an example hardware configuration of the signal processor.

As illustrated in FIG. 16, the signal processor 130 includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD); and a semiconductor memory. The recording medium 925 may be provided in the form of "packaged software". In this case, the programs stored in the recording medium 925 may be read by the drive 919 and stored in the recording device 917 through devices such as the input-output interface 911 and the bus 909.

In another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In another possible embodiment, the programs may be stored in an external connection device 927, which can be any convenient connection device. In this case, the programs are transmitted through the connection port 921 and stored in the recording device 917 through devices such as the input-output interface 911 and the bus 909.

Then, the CPU 901 performs various kinds of processing based on the programs stored in the recording device 917 so as to implement the processings performed at the elements such as the absolute position identifier 131, the first position identifier 132, the second position identifier 133, the signal selector 134, and the position data generator 135. In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various kinds of processing based on signals or information input through the input device 913, such as a mouse, a keyboard, and a microphone (not illustrated).

Then, the CPU 901 may output results of the processings from the output device 915, such as a display device and a sound output device. As necessary, the CPU 901 may send results of the processings through the communication device 923 and the connection port 921 and store the results of the processings in the recording device 917 and/or the recording medium 925.

Otherwise, the above-described embodiments and modifications may be combined in any manner deemed suitable.

In the present disclosure, the term "comprise" and its variations are intended to mean open-ended terms, not excluding any other elements and/or components that are not recited herein. The same applies to the terms "include", "have", and their variations.

In the present disclosure, a component suffixed with a term such as "member", "portion", "part", "element", "body", and "structure" is intended to mean that there is a single such component or a plurality of such components.

In the present disclosure, ordinal terms such as "first" and "second" are merely used for distinguishing purposes and there is no other intention (such as to connote a particular order) in using ordinal twins. For example, the mere use of "first element" does not connote the existence of "second element"; otherwise, the mere use of "second element" does not connote the existence of "first element".

In the present disclosure, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

In the present disclosure, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An encoder comprising:
a scale being movable along a measurement direction and having a first absolute pattern, a second absolute pattern, and a third absolute pattern that are provided along the measurement direction; and
a sensor configured to measure the first absolute pattern, the second absolute pattern, and the third absolute pattern when the scale moves along the measurement direction, the sensor comprising:
a light source configured to emit light to the scale;
a first absolute light receiver configured to receive the light transmitted through or reflected on the first absolute pattern of the scale,
a second absolute light receiver provided opposite to the first absolute light receiver with respect to an optical axis of the light source and configured to receive the light transmitted through or reflected on the second absolute pattern;
a third absolute light receiver provided between the first absolute light receiver and the second absolute light receiver and configured to receive the light transmitted through or reflected on the third absolute pattern of the scale; and
a fourth absolute light receiver provided between the first absolute light receiver and the second absolute light receiver so that the light source is provided between the third absolute light receiver and the fourth absolute light receiver along the measurement direction, the fourth absolute light receiver being configured to receive the light transmitted through or reflected on the third absolute pattern of the scale.

2. The encoder according to claim 1, wherein the scale is made of light reflecting material and wherein the first absolute pattern, the second absolute pattern, and the third absolute pattern are formed by etching.

3. An encoder comprising:
a scale being movable along a measurement direction and having a first absolute pattern and a second absolute pattern that are provided along the measurement direction;
a sensor configured to measure the first absolute pattern and the second absolute pattern when the scale moves along the measurement direction, the sensor comprising:
a light source configured to emit light to the scale;
a first absolute light receiver configured to receive the light transmitted through or reflected on the first absolute pattern of the scale, the first absolute light receiver comprising:
a plurality of first light receiving elements each configured to output a first absolute signal with a first phase when each of the plurality of first light receiving elements receives the light transmitted or reflected; and
a plurality of second light receiving elements each configured to output a first absolute signal with a second phase different from the first phase when each of the plurality of second light receiving elements receives the light transmitted or reflected, each of the plurality of first light receiving elements and each of the plurality of second light receiving elements being arranged alternately along the measurement direction; and
a second absolute light receiver provided opposite to the first absolute light receiver with respect to an optical axis of the light source and configured to receive the light transmitted through or reflected on the second absolute pattern, the second absolute light receiver comprising:
a plurality of third light receiving elements each configured to output a second absolute signal with the first phase when each of the plurality of third light receiving elements receives the light transmitted or reflected; and
a plurality of fourth light receiving elements each configured to output a second absolute signal with the second phase when each of the plurality of fourth light receiving elements receives the light transmitted or reflected, each of the plurality of third light receiving elements and each of the plurality of fourth light receiving elements being arranged alternately along the measurement direction.

4. The encoder according to claim 3, further comprising:
a first signal combiner configured to combine the first absolute signal having the first phase with the second absolute signal having the first phase to generate a first phase signal; and
a second signal combiner configured to combine the first absolute signal having the second phase with the second absolute signal having the second phase to generate a second phase signal.

5. The encoder according to claim 4,
wherein the scale has an incremental pattern provided along the measurement direction, and
wherein the sensor comprises an incremental light receiver provided between the first absolute light receiver and the second absolute light receiver, the incremental light receiver being configured to receive the light emitted from the light source and transmitted through or reflected on the incremental pattern and configured to output an incremental signal.

6. The encoder according to claim 5,
wherein the incremental pattern has a first incremental pattern and a second incremental pattern shorter in pitch than the first incremental pattern,
wherein the incremental light receiver comprises
a first incremental light receiver configured to receive the light transmitted through or reflected on the first incremental pattern, and configured to output a first incremental signal, and
a second incremental light receiver provided opposite to the first incremental light receiver with respect to the optical axis, the second incremental light receiver being configured to receive the light transmitted through or reflected on the second incremental pattern and configured to output a second incremental signal.

7. The encoder according to claim 3, wherein the first absolute light receiver is configured to output the first absolute signal such that the first absolute signal is substantially same in size to the second absolute signal output from the second absolute light receiver.

8. The encoder according to claim 7,
wherein the first absolute light receiver has a first light receiving area in which a first amount of the light is received, and wherein the second absolute light receiver has a second light receiving area in which a second amount of the light is received, the second amount of the light being approximately equal to the first amount of the light.

9. The encoder according to claim 3, wherein the sensor comprises
a first position adjustment light receiver adjacent to the first absolute light receiver in the measurement direction, the first position adjustment light receiver being configured to receive the light transmitted through or reflected on the first absolute pattern and configured to output a first position adjustment signal, and
a second position adjustment light receiver adjacent to the second absolute light receiver in the measurement direction, the second position adjustment light receiver being configured to receive the light transmitted through or reflected on the second absolute pattern and configured to output a second position adjustment signal.

10. The encoder according to claim 3,
wherein the scale comprises a disc on which the first absolute pattern and the second absolute pattern are provided along a circumferential direction of the disc around a disc center of the disc, and
wherein the sensor is configured to measure the first absolute pattern and the second absolute pattern along the circumferential direction.

11. The encoder according to claim 4, wherein the first absolute light receiver is configured to output the first absolute signal such that the first absolute signal is substantially same in size to the second absolute signal output from the second absolute light receiver.

12. The encoder according to claim 5, wherein the first absolute light receiver is configured to output the first absolute signal such that the first absolute signal is substantially same in size to the second absolute signal output from the second absolute light receiver.

13. The encoder according to claim 6, wherein the first absolute light receiver is configured to output the first absolute signal such that the first absolute signal is substantially same in size to the second absolute signal output from the second absolute light receiver.

14. The encoder according to claim 3, wherein the scale is made of light reflecting material and wherein the first absolute pattern and the second absolute pattern are formed by etching.

15. A servo motor comprising:
a motor comprising a stator and a movable member movable rotationally or linearly relative to the stator along a measurement direction; and
an encoder configured to detect at least one of a position, a speed, and an acceleration of the movable member, the encoder comprising:
a scale being movable with the movable member along the measurement direction and having a first absolute pattern and a second absolute pattern that are provided along the measurement direction;
a sensor configured to measure the first absolute pattern and the second absolute pattern when the scale moves along the measurement direction, the sensor comprising:
a light source configured to emit light to the scale;
a first absolute light receiver configured to receive the light transmitted through or reflected on the first absolute pattern of the scale, the first absolute light receiver comprising:
a plurality of first light receiving elements each configured to output a first absolute signal with a first phase when each of the plurality of first light receiving elements receives the light transmitted or reflected; and
a plurality of second light receiving elements each configured to output a first absolute signal with a second phase different from the first phase when each of the plurality of second light receiving elements receives the light transmitted or reflected, each of the plurality of first light receiving elements and each of the plurality of second light receiving elements being arranged alternately along the measurement direction; and
a second absolute light receiver provided opposite to the first absolute light receiver with respect to an optical axis of the light source and configured to receive the light transmitted through or reflected on the second absolute pattern, the second absolute light receiver comprising:
a plurality of third light receiving elements each configured to output a second absolute signal with the first phase when each of the plurality of third light receiving elements receives the light transmitted or reflected; and
a plurality of fourth light receiving elements each configured to output a second absolute signal with the second phase when each of the plurality of fourth light receiving elements receives the light transmitted or reflected, each of the plurality of third light receiving elements and each of the plurality of fourth light receiving elements being arranged alternately along the measurement direction.

16. A servo system comprising:
a motor comprising a stator and a movable member movable rotationally or linearly relative to the stator along a measurement direction;
an encoder configured to detect at least one of a position, a speed, and an acceleration of the movable member, the encoder comprising:
a scale being movable with the movable member along the measurement direction and having a first absolute pattern and a second absolute pattern that are provided along the measurement direction;
a sensor configured to measure the first absolute pattern and the second absolute pattern when the scale moves along the measurement direction, the sensor comprising:
a light source configured to emit light to the scale;
a first absolute light receiver configured to receive the light transmitted through or reflected on the first absolute pattern of the scale, the first absolute light receiver comprising:
a plurality of first light receiving elements each configured to output a first absolute signal with a first phase when each of the plurality of first light receiving elements receives the light transmitted or reflected; and
a plurality of second light receiving elements each configured to output a first absolute signal with a second phase different from the first phase when each of the plurality of second light receiving elements receives the light transmitted or reflected, each of the plurality of first light receiving elements and each of the plurality of second light receiving elements being arranged alternately along the measurement direction; and a second absolute light receiver provided opposite to the first absolute light receiver with respect to an optical axis of the light source and configured to receive the light transmitted through or reflected on the second absolute pattern, the second absolute light receiver comprising:

a plurality of third light receiving elements each configured to output a second absolute signal with the first phase when each of the plurality of third light receiving elements receives the light transmitted or reflected; and a plurality of fourth light receiving elements each configured to output a second absolute signal with the second phase when each of the plurality of fourth light receiving elements receives the light transmitted or reflected, each of the plurality of third light receiving elements and each of the plurality of fourth light receiving elements being arranged alternately along the measurement direction; and a control apparatus configured to control the motor based on the at least one of the position, the speed, and the acceleration of the movable member detected by the encoder.

* * * * *